United States Patent
Doshi et al.

(10) Patent No.: US 12,413,451 B2
(45) Date of Patent: Sep. 9, 2025

(54) GENERATION OF COMPLETE LARGE SCALE PARAMETER MAPS

(71) Applicant: QUALCOMM Incorporated, San Diego, CA (US)

(72) Inventors: Akash Sandeep Doshi, San Diego, CA (US); June Namgoong, San Diego, CA (US); Taesang Yoo, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 18/523,803

(22) Filed: Nov. 29, 2023

(65) Prior Publication Data
US 2025/0175367 A1 May 29, 2025

(51) Int. Cl.
*H04L 25/02* (2006.01)

(52) U.S. Cl.
CPC ........ *H04L 25/0254* (2013.01); *H04L 25/022* (2013.01)

(58) Field of Classification Search
CPC ............. H04L 25/0254; H04L 25/0256; H04L 25/0252; H04L 25/022; H04L 25/0222; H04L 25/025; H04L 25/024
See application file for complete search history.

(56) References Cited

U.S. PATENT DOCUMENTS

| | | | |
|---|---|---|---|
| 10,309,812 B1* | 6/2019 | Zhang | G01F 1/86 |
| 2020/0412431 A1* | 12/2020 | Park | H04B 7/0469 |
| 2023/0085270 A1 | 3/2023 | Zirwas et al. | |
| 2023/0412430 A1* | 12/2023 | Yang | H04B 7/0626 |
| 2025/0070857 A1* | 2/2025 | Dreiling | H04B 7/18539 |

OTHER PUBLICATIONS

Huang J., et al., "A Big Data Enabled Channel Model for 5G Wireless Communication Systems", IEEE Transactions on Bib Data vol. X, No. X, arXiv:2002.12561v1 [eess.SP], Arxiv.Org, Cornell University Library, 201 Olin Library Cornell University Ithaca, NY, 14853, Feb. 28, 2020, pp. 1-12, XP081610161, abstract; figure 2.
International Search Report and Written Opinion—PCT/US2024/052290—ISA/EPO—Jan. 30, 2025.
(Continued)

*Primary Examiner* — Khanh C Tran
(74) *Attorney, Agent, or Firm* — Polsinelli LLP

(57) ABSTRACT

Systems and techniques are described herein for wireless communication. For example, a computing device (e.g., a user equipment or component thereof) can obtain channel estimation of at least one channel for communication with a network device. The computing device can obtain a location parameter associated with the computing device. The computing device can determine, based at least on the channel estimation, one or more large scale parameters (LSPs). The computing device can further generate an LSP vector associated with the one or more LSPs. The computing device can transmit, to the network device, the LSP vector and the location parameter of the computing device.

30 Claims, 16 Drawing Sheets

(56) References Cited

OTHER PUBLICATIONS

Liu Y., et al., "3.5 GHz Outdoor Radio Signal Strength Prediction With Machine Learning Based on Low-Cost Geographic Features", IEEE Transactions on Antennas and Propagation, IEEE, USA, vol. 70, No. 6, May 19, 2022, pp. 4155-4170, XP011911327, sections I, III and V; figures 1-2.

Thrane J., et al., "Model-Aided Deep Learning Method for Path Loss Prediction in Mobile Communication Systems at 2.6 GHz", IEEE Access, IEEE, USA, vol. 8, Jan. 6, 2020, pp. 7925-7936, XP011765565, sections II-IV; figure 1.

Carion N., et al., "End-to-End Object Detection with Transformers", arXiv:2005.12872v3 [cs. CV], May 28, 2020, 26 pages.

He K., et al., "Masked Autoencoders are Scalable Vision Learners", Dec. 19, 2021, Facebook AI Research, pp. 1-14.

\* cited by examiner

GENERATION OF COMPLETE LARGE SCALE PARAMETER MAPS

TECHNICAL FIELD

The present disclosure generally relates to wireless communications. For example, aspects of the present disclosure relate to systems and techniques for generating complete large scale parameter (LSP) maps.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In wireless communications, a transmitting device can transmit a signal over an air interface to a receiving device. For example, a user equipment such as a mobile phone can establish a communication channel with a cellular base station. A channel estimation process consists of multiple steps. First, a mathematical model is created of the channel. A signal which is known by both sender and receiver is transmitted over the channel. When the receiving device receives the signal, the signal is likely distorted and contains noise from the channel. The receiving device also knows the original signal and thus it can compare the original signal and received signal to extract the properties of the channel and the noises added to the sent signal in the channel.

Channels can affect different frequency signals differently. Because of the different treatment of different frequencies, channel estimation is typically done for each frequency channel. Depending on the number of channels, the process of estimating a channel can be complex and can consume resources.

SUMMARY

Channels in a wireless communication system can have different channel quality and/or characteristics at different locations. Channel modeling can include generating large scale parameters (LSPs) (e.g., path loss, delay spread, various angular spreads, etc.) for a given set of locations and using the LSPs to specify statistics of distributions that can be used to generate channel samples. However, in some cases, LSPs may not be available for all locations. For instance, LSPs may only be available for locations for which LSP measurements have been obtained by a device, such as a user equipment (UE), referred to as measured locations.

According to various aspects, systems and techniques are described herein for generating an LSP parameter map including LSP information for unmeasured locations (e.g., locations for which one or more UEs have not measured LSPs). The systems and techniques provide a data-driven, site-specific LSP prediction framework that can utilize geographical map information as input to a trained machine learning model to predict LSPs at unmeasured locations given a smaller number of LSP measurements (e.g., LSP measurements for less than all locations in a given geographic area). For example, the trained machine learning model can predict the LSP map based on LSP vectors from a plurality of UEs. In some cases, based on a location of a UE, an LSP vector can be transmitted to the UE for use in performing channel estimation.

In some aspects, the techniques described herein relate to an apparatus for wireless communication at a user equipment (UE), the apparatus including: at least one memory; and at least one processor coupled to at least one memory and configured to: obtain channel estimation of at least one channel for communication with a network device; obtain a location parameter associated with the apparatus; determine, based at least on the channel estimation, one or more large scale parameters (LSPs); generate an LSP vector associated with the one or more LSPs; and transmit, to the network device, the LSP vector and the location parameter of the apparatus.

In some aspects, the techniques described herein relate to an apparatus for wireless communication at a network device, the apparatus including: at least one memory; and at least one processor coupled to at least one memory and configured to: receive, from a user equipment (UE), a large scale parameter (LSP) vector and a location of the UE, the LSP vector including at least one parameter based on an estimated channel at the location of the UE; obtain map information associated with UE, the map information including a previously trained LSP map; predict, based at least on the map information, the LSP vector, at least one LSP for at least one unmeasured location, wherein the at least one unmeasured location includes a different location from the location of the UE; and transmit the at least one LSP to a device.

In some aspects, the techniques described herein relate to an apparatus for wireless communication, the apparatus including: at least one memory; and at least one processor coupled to at least one memory and configured to: transmit, to a network device, a location of the apparatus; receive, from the network device, a predicted large scale parameter (LSP) vector based on the location of the apparatus; and generate channel samples using at least the predicted LSP vector.

In some aspects, the techniques described herein relate to an apparatus for generating one or more synthetic large scale parameter (LSP) maps, the apparatus including: at least one memory; and at least one processor coupled to at least one memory and configured to: obtain a map having a network device location identified on the map; obtain at least one synthetic measurement associated with the network device location; and determine, based at least on the map and the at least one synthetic measurement, a LSP map.

In some aspects, the techniques described herein relate to an apparatus for generating a synthetic large scale parameter map, the apparatus including: at least one memory; and at least one processor coupled to at least one memory and configured to: obtain a map having a network device location identified on the map; obtain at least one synthetic measurement associated with the network device location; and determine, based at least on the map and the at least one synthetic measurement, a synthetic large scale parameter (LSP) map.

In some aspects, the techniques described herein relate to an apparatus for generating a synthetic large scale parameter map, the apparatus including: at least one memory; and at least one processor coupled to at least one memory and configured to: obtain a map having a network device location identified on the map; obtain at least one measurement associated with the network device location; and train, based at least on the map and the at least one measurement, a machine learning model to generate a synthetic large scale parameter (LSP) map.

In some aspects, the techniques described herein relate to an apparatus for training a machine learning model, the apparatus including: at least one memory; and at least one processor coupled to at least one memory and configured to: obtain sparse synthetic measurements and a geographic map having a network device at a location; train the machine learning model on the sparse synthetic measurements and the geographic map to generate a complete large scale parameter map to generate a trained machine learning model; obtain sparse real measurements and the complete large scale parameter map; and finetune the trained machine learning model based on the sparse real measurements and the complete large scale parameter map to generate a finetuned machine learning model.

In some aspects, the techniques described herein relate to an apparatus for training a transformer, the apparatus including: at least one memory; and at least one processor coupled to at least one memory and configured to: obtain sparse large scale parameter (LSP) measurements at an encoder of the transformer; obtain, at the encoder, a positional embedding identifying locations of the sparse LSP measurements; generate, by the encoder, a memory or dataset; receive the dataset at a decoder of the transformer; receive a map tuple as a prompt to the decoder; and output, using the map tuple as a guide and from the decoder, a complete LSP map for a geographic area.

In some aspects, the processes described herein (e.g., processes 600, 700, 800, 900, 1000, 1100, 1200 and/or other process described herein) may be performed by a computing device or apparatus or a component or system (e.g., a chipset, one or more processors (e.g., CPU, GPU, NPU, DSP, etc.), ML system such as a neural network model, etc.) of the computing device or apparatus. In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
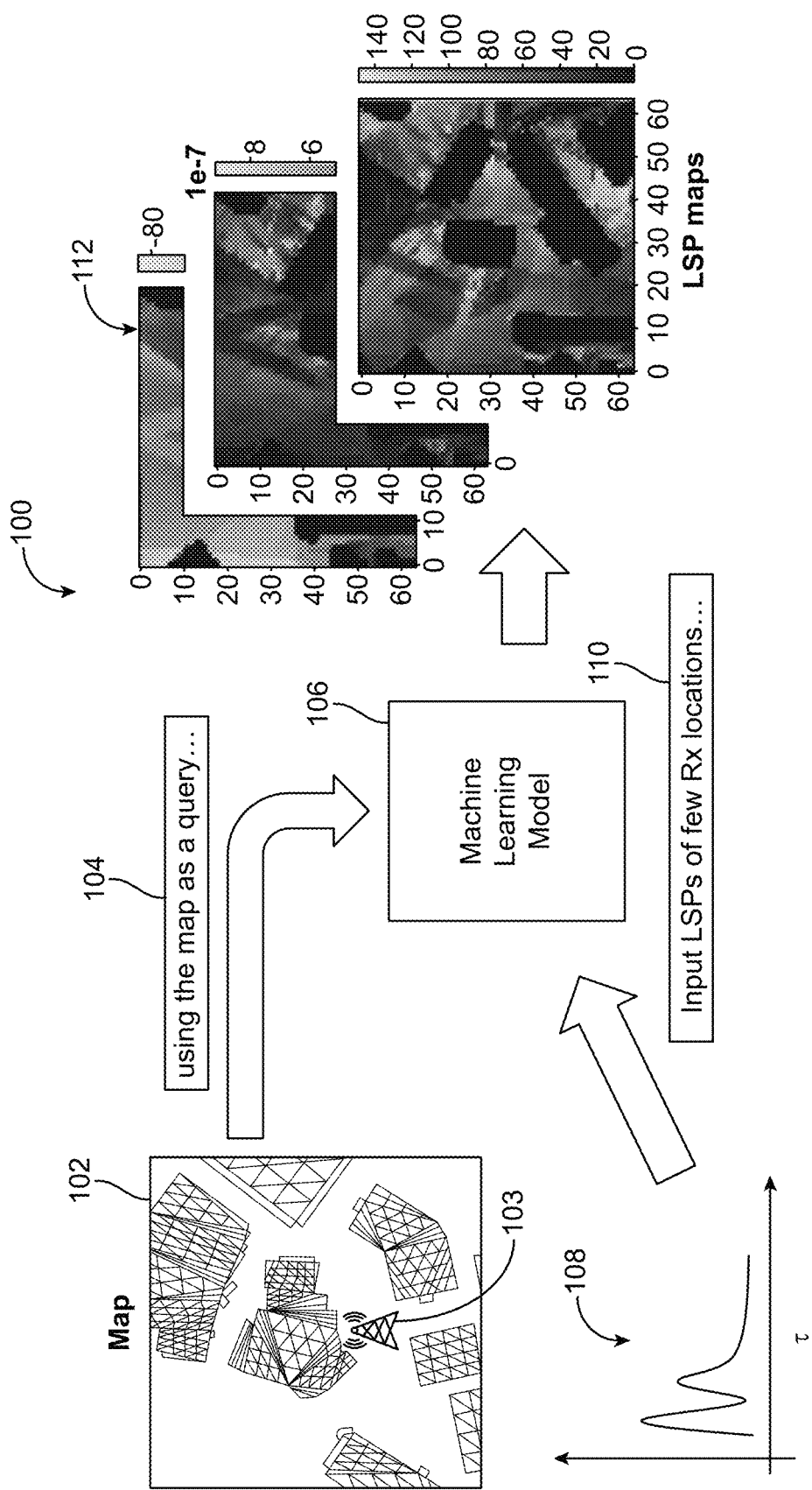
FIG. 1 is a diagram illustrating an example training stage for generating large scale parameter maps of a geographical area, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As noted previously, depending on a number of frequency channels, the process of estimating a channel can be complex and can consume resources. Systems, apparatuses, electronic devices, methods (also referred to as processes), and computer-readable media (collectively referred to herein as "systems and techniques") are described herein for generating complete large scale parameter (LSP) maps. In some aspects, a complete LSP map can be used by user equipment (UE) at a particular location for generating real channel samples for cellular communications with a network device (e.g., a base station, such as a gNB, or a portion of the base station, such as a central unit (CU), a distributed unit (DU), a radio unit (RU), a Near-Real Time (Near-RT) RAN Intelligent Controller (RIC), or a Non-Real Time (Non-RT) RIC of a disaggregated base station).

In some cases, the systems and techniques can utilize a machine learning system (e.g., a neural network system or model, such as a transformer neural network) for completing LSP maps. While transformers are described as one example neural network or machine learning model in the present disclosure, the systems and techniques described herein are not limited to a transformer neural network model and can be implemented using other types of machine learning systems or models.

In some aspects, using LSP measurements for one or more locations and map information for the one or more locations as input to the machine learning system, the machine learning system can be trained to generate complete LSP maps for the one or more locations. As described below, LSPs can include path loss (PL), a delay spread (DS), an angular spread or angle spread of arrival (ASA), an azimuth angel spread of departure (ASD), a zenith angle spread of arrival (ZSA), a zenith angle spread of departure (ZSD), any combination thereof, and/or other parameters. Once trained, the machine learning system can receive LSPs (e.g., LSP vectors including LSPs) from one or more UEs located at various locations. The LSPs from the one or more UEs can be used by the machine learning system at inference to complete an LSP map and/or to finetune the machine learning system.

In some cases, a network device including the machine learning system (or a separate network device) can receive a location (e.g., receive coordinates) from a UE. Based on the received location, the network device can use the machine learning system to generate LSPs (e.g., an LSP vector) for the location and can transmit the LSPs to the UE.

In aspects using a transformer as the machine learning model, the transformer can embed each LSP using a multi-layer perceptron and can utilize UE location data to compute random Fourier feature based positional embedding. The transformer can provide LSP embedding and positional embedding as input to encoder and generate an output (which in some cases can be referred to as a memory). A decoder of the transformer can use the encoder output (e.g., the memory) in conjunction with an embedding of a map (e.g., a building map) to predict LSP at all map locations. The embedding of the map provided to the decoder can be a "prompt" (in which case the transformer is a "promptable" transformer).

A transformer is a particular type of neural network. For instance, assuming n vectors are input to a transformer, the transformer can calculate a dot product of each vector with every other vector and then applies a Softmax layer (or in some cases a multilayer perceptron (MLP)). After the transformer applies the Softmax layer, the transformer calculates a weighted combination of the output. Transformers perform a large number of computations when perform such operations. In some cases, the large number of computations can be due to the use of pair-wise self-attention in addition to the Softmax function. Further, Softmax operations performed by the Softmax layer are known to be computationally expensive and slow. For instance, the Softmax function converts a vector of K real numbers into a probability distribution of K possible outcomes. In neural network applications, the number K of possible outcomes can be large. For instance, in the case of neural language models that predict the most likely outcome out of a vocabulary, the possible outcomes may contain millions of possible words. For prediction based on images, the outcome can even be higher. Such a large number of possible outcomes can make the calculations for the Softmax layer computationally expensive. Further, the gradient descent backpropagation method for training such a neural network involves calculating the Softmax for every training example. The number of training examples can also become large.

Various aspects of the application will be described with respect to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 is a diagram illustrating an overview of a training stage 100 for generating a large scale parameter (LSP) map used for channel estimation in cellular communications. LSPs include or represent channel characteristics in a wireless communication system (e.g., between a user equipment or user terminal and a network device 103), such as over larger areas of several wavelengths. Examples of LSPs can include or can be related to shadow fading, angular spread, delay spread, among other parameters, as described in more detail below. For instance, with respect to angle spread, in wireless communications, the received signal can be composed of several multipath propagation components, which can be characterized as "rays" that arrive from different directions. In one example, with a number of rays, the angle spread can be characterized or defined using each ray's angle of arrival or departure, its power and the nominal direction. The angle spread is a function of how the multipath components arrive or depart relative to a nominal angle of arrival or angle of departure respectively.

In one example, the European Telecommunications Standards Institute (ETSI) 3GPP TR (Technical Report) 38.901, version 14.2.0, Release 14 (incorporated herein by reference), describes a number of LSPs, including a path loss (PL), a delay spread (DS), an angular spread or angle spread of arrival (ASA), an azimuth angel spread of departure (ASD), a zenith angle spread of arrival (ZSA), a zenith angle spread of departure (ZSD), Ricean K factor (K), shadow fading (SF), any combination thereof, and/or other parameters. One or more of these LSPs can be generated based on cross correlation data and using certain procedures as outlined in 3GPP TR 38.901. Note that the term LSP as used herein generally refers to parameters that describe or represent channel characteristics. In some cases, LSPs can also include parameters related to channel characteristics over lager areas of several wavelength, and is thus defined based on a channel frequency used. The LSPs can be generated based on one or more of a cross correlation value, a procedure that uses a square root matrix being generated using a Cholesky decomposition or based on other factors.

Figure 3:
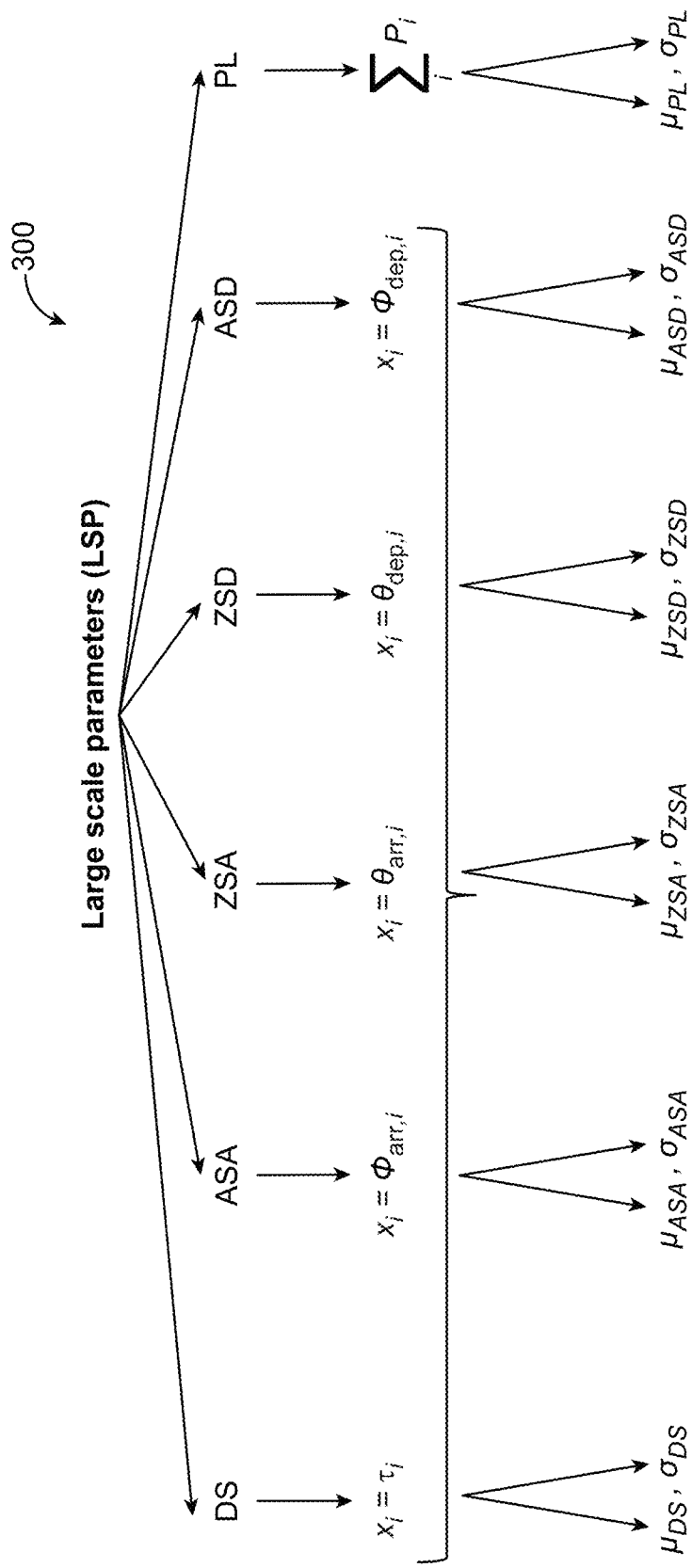
FIG. 3 is a diagram illustrating example large scale parameters (LSP), according to aspects of the disclosure.

In some aspects, the Rician K factor (K) and the SF can be used to calculate the path loss (PL). FIG. 3 illustrates these large scale parameters in more detail. The LSP parameters may also include any one or more of the specific parameters outlined above.

In general, the LSPs can relate to channel characteristics for particular locations in an environment, which can be represented in a map. For example, a city street may include buildings on one side and a park on the other, with the city street being served in terms of cellular communications by one base station. As a person with a mobile phone (e.g., user equipment (UE)) walks by a building or across the street to a park, the LSP parameters for the channel from the mobile phone to the base station would change based on the particular current location of the mobile phone. In some cases, as disclosed herein, different measurements of LSP parameters at different locations are useful for training the machine learning model or transformer. Instructions might be given to individual users of UEs to move to a different location or provide an LSP measurement at a particular time. Thus, some of the signaling disclosed herein can relate to requests for measurements, gathering or obtaining a measurement value related to LSPs and transmitting or providing the measured LSP from a UE to a network device such as a base station or gNodeB.

The network device 103 (e.g., a base station, such as a gNodeB) shown in FIG. 1 has a location in an environment. The location is associated with LSP data of multiple UEs 205 connected to the network device 103 and a geographical map 102. The base station of network device 103 may be positioned in the middle of the geographical map 102, but may be located at other positions in the geographical map 102. Channel samples of sparse synthetic measurements 108 are used to compute the LSP values in the geographical map 102. The geographical map 102 can include, for example, a street map of a geographical area. The geographical map 102 may be in two dimensions in some cases. In other cases, the geographical map 102 may be a three-dimensional view of a geographical area. The geographical map 102 can include a topographical map of any type and may be used to identify landscape, buildings, streets and the general characteristics of the mapped area. The geographical map 102 for example might include a building map and a height map as a tuple. The building map could be a binary map (e.g., with 0 and 1 values) that indicates the presence of the absence of a triangle coordinate in a pixel. The height map could include a height value coordinate of a triangle in a pixel.

The training stage 100 can include a first stage and a second stage, which can be used to train or configure a system (e.g., a machine learning system) to determine LSPs for mapped areas. The first stage can include using sparse synthetic measurements 108 as input to a first machine learning model 106. In some aspects, the sparse synthetic measurements 108 can be generated by performing a ray-tracing operation (or other technique). The first machine learning model 106 can refer to a pretrained or initial version of a machine learning model, a transformer, a neural network or any other type of model which can be a prediction framework for completing LSP maps 112. In order to pretrain the first machine learning model 106, there are several approaches that can be applied. In one approach, input LSPs for a small number of sites in the map 102 can be simulated though ray-tracing for a set of locations on the geographic map 102. The system or a first machine learning model 106 can "interpolate" or "extrapolate", based on the initial sparse synthetic measurements 108 generated from the ray-tracing, to predict LSPs for any location on the map 102. The sparse synthetic measurements 108 can be used to compute input LSPs for a few receive locations 110 related to the geographical map 102 and the location of the base station or network device 103.

As noted above, the machine learning model 106 is trained on the synthetic data (e.g., generated using ray tracing) to generate complete or synthesis LSP maps 112. In some cases, the training process can include an interpolation or extrapolation problem where a number of synthetic measurements (a first set of measurements) are provided to the first machine learning model 106. The measurements can be used to generate predictions at all locations (or for locations outside of the number of measurements) on the geographical map 102. The LSP maps 112 provide a prediction of the LSPs for the various locations across the geographical map 102. For example, with reference to the example city street discussed above, the LSP maps 112 may provide predicted LSPs for positions such as on a street, next to a building, in a park and so forth across the geographical map 102. The result of the training phase can be a pretrained machine learning model or transformer which can be finetuned in a second stage. The machine learning model can then be used to generate data (e.g., LSP maps 112) that can be used by user equipment to predict or estimate channel characteristics for communication with the base station or network device 103.

As previously described, the sparse synthetic measurements 108 can be generated by performing ray-tracing operations. For example, the map 102 can be provided to a ray-tracing application. The map can include a location of the base station or network device 103 and geographic information about the area covered in the map such as roads, buildings, parks by way of example. A respective location of a receiver or a user equipment can be identified at various points of the map and the application can generate synthetic ray-tracing data for each receiver location on the map as the sparse synthetic measurements 108. A ray-tracing application is one example of how the sparse synthetic measurements 108 can be obtained. Other applications can be used as well. One or more of a two-dimensional map and a height map can be used as the map 102. A height map provides a mapping or identification of a height at a given area on the map. The use of a two-dimensional map and the height map can take the place of using a three-dimensional map. Note that any map can be used however, and the implementation is not limited to any specific type of map or maps.

Figure 2A:
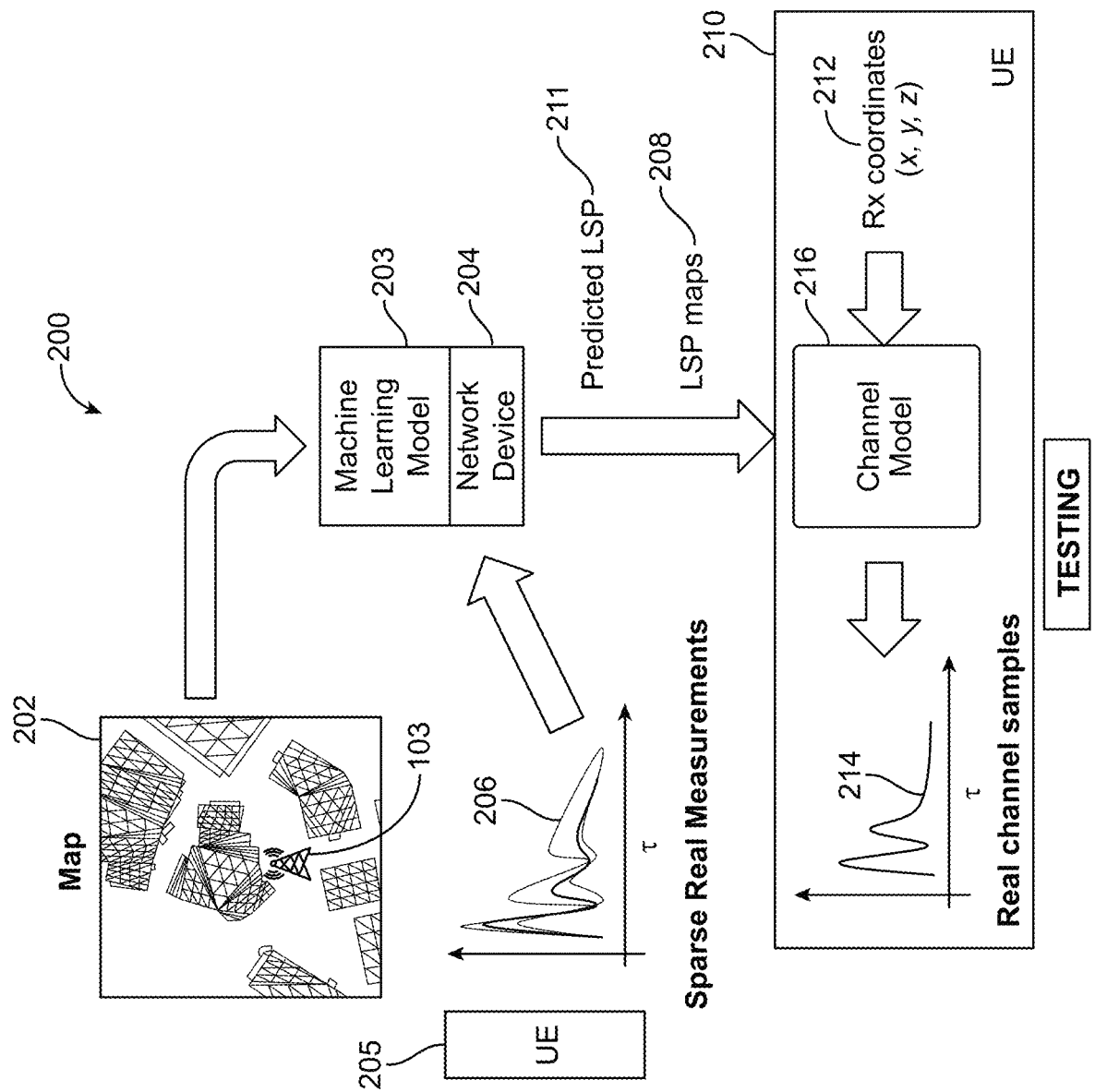
FIG. 2A is a diagram illustrating an example testing stage for generating channel samples, according to aspects of the disclosure.

FIG. 2A illustrates a finetuning and testing stage 200 for generating real channel samples. In the finetuning and testing stage 200, the results of the training stage 100 are provided to a second machine learning model 203 (which can be the same model as the first machine learning model 106). The results can include an LSP map 202. In another aspect, the map 202 can be the same as the map 102 or another type of map. In some aspects, the second machine learning model 203 can be the same as the first machine learning model 106 except that the first machine model 106 at this stage is trained on the sparse synthetic measurements 108 and is ready for finetuning. The map 202 can be a two dimensional map, a three dimensional map, or a combination of different maps such as a topographical map and a height map that identifies, for example, heights of buildings, hills or other objects at different locations.

In some aspects outlined below, the training stage for the first machine learning model 106 may also include using some real-world measurement LSP data provided as input to the first machine learning model 106. The input data can include one or more of a small amount of synthetic data, a small amount of real-world measurement data, a large amount of synthetic data and a large amount of real-world measurement data. The map 102 can include a real-world map, a three dimensional map, a combination of a building map and a height map, a synthetic or simulated map and so forth.

As part of the finetuning process, the second machine learning model 203 can be trained using sparse real measurements 206 which can include a small number of actual measurements from user equipment (UE) 205 in various locations of the map 202. The UE 205 performs channel estimation and computes LSPs (e.g., one or more LSP each having one or more parameter) for an estimated channel. The UE 205 reports or transmits an LSP vector and a UE location to a network device 204 (e.g., a base station of gNodeB). The network device 204 can operate or have access to a second machine learning model 203 (again, which can be the pretrained or first machine learning model 106). The LSP vector(s) received from one or more UEs 205 can represent the sparse real measurements 206, which are real-world data use to generate channels at any location in the geographic area of the map 202 and can also be used to refine the first machine learning model 106 into the second machine learning model 203.

The second machine learning model 203 can be a transformer model that can be finetuned from the pretrained version on the sparse synthetic measurements 108 or may also be trained on real data in some scenarios. The sparse real measurements 206 can represent multiple respective LSP vectors and respective UE locations receives from multiple UEs 205 at various locations. In some aspects, the process can be defined as a map-guided interpolation and extrapolation to predict LSPs at unmeasured UE locations or for UE locations that are outside of a set of UE locations for which measured data is received. For example, the location of the multiple UEs 205 that provide real measurements 206 can be identified as a set of "measured" UE locations. For locations outside of that set, the finetuned prediction model or second machine learning model 203 can be used or trained to predict LSP's for the locations outside of the set of measured UE locations.

The second machine learning model 203 can be refined and trained to generate (e.g., through interpolation/extrapolation) via the real-world sparse measurements 206 a refined or completed LSP map 208. The network device 204 utilizes the receive sparse real measurements 206 to refine the prediction model 203 or complete LSP map 208.

In some aspect, the LSP map 208 can remain on the network device 204 for use in predicting an LSP for a specific location of an individual UE 210. In another aspect, the refined LSP map 208 can be provided to a channel model 216 (e.g., such as a generative channel model) which receives receive coordinates 212 from a UE 210 (e.g., a new UE 210 that connects to the network at the network device 204 that is trying to perform resource signal (RS) related optimizations (e.g., demodulation reference signal (DM-RS) precoder optimization)) and which can be used to generate real channel samples 214 at any location on the map for channel estimation and wireless communication between the user equipment and a base station or network device 103. Thus, the process of utilizing the LSP maps 208 to predict a particular LSP for the UE 210 location can occur either on the network device 204 or at the UE 210. It is preferable that the UE 210 transmit its location to the network device 204, which will then use the second machine learning model 203 to predict the LSP for that location and return the predicted LSP to the UE 210. The channel model 216 is then utilized by UE 210 to generate the real channel samples 214 given the predicted LSP that is received from the network device 204.

The purpose of the channel model 216 is to generate representative channel samples for a particular area. In a testing or channel generation phase, the receive coordinates 212 can be received by or obtained on a UE 210. The LSP obtained by the UE 210 can be provided to the channel model 216 to then generate real channel samples 214 at the location of UE 210. The LSP maps 208 can be considered "real world" LSP maps in that they are refined and generated using real time measurements from one or more user equipment in actual locations.

In some aspects, the generative channel model 216 generates channel samples which can be used to perform reference-signal-related optimizations such as which DM-RS precoder to use.

In another aspect, the UE 210 transmits its location to the network device 204 or the network device 204 obtains in general the location of the UE 210. The second machine learning model 203 in this case performs a map-guided interpolation and extraposition to predict one or more LSP's at an unmeasured UE location that can be based on the UE 210 location. UE 210 receives the predicted LSP 211 based on the UE 210 location. The generative channel model 216 then uses the predicted LSP 211 to generate the real channel samples 214 for the UE 210.

With respect to signaling, the UE 210 can transmit its location data to the network device 204 which can include or have access to the machine learning model 203. The network device 204 can provide either the LSP maps 208 or the predicted LSP 211 based on the received UE location 212.

In one aspect, the UE 205 or UE 210 may get an instruction to gather variance data. For example, the UE 205/210 may be asked to transmit measured data at a location of the UE 205/210, and then move around to send additional measured data in time or space, which can strategically provide more data for the machine learning model 203 to predict LSPs for non-measured locations.

Aspects of this disclosure can include various signaling operations such as, from the UE 205 standpoint, the transmission of LSP vectors and UE location as data to the network device 204 for use in finetuning the second machine learning model 203 which can be configured on a network device 204. Once the LSP map 208 is generated, the network device 204 can transmit the LSP map 208 to a UE 210 (which can be the same UE 205 or a different UE). The signaling can include acknowledgement signals, for example, from the network device 204 upon receiving the sparse real measurements 206. The UE 210 may send acknowledgment signals for receiving an LSP map 208 or a predicted LSP 211.

In general, signaling according to aspects of this disclosure can help in performing one or more optimizations. The signaling can include the network transmitting a predicted LSP vector to the UE 210 such that the UE 210 can provide the LSP vector as conditional input to a generative channel model 216 and utilize the generated channel samples to optimize one or more feature such as determining how to configure or select a DM-RS precoder.

Figure 2B:
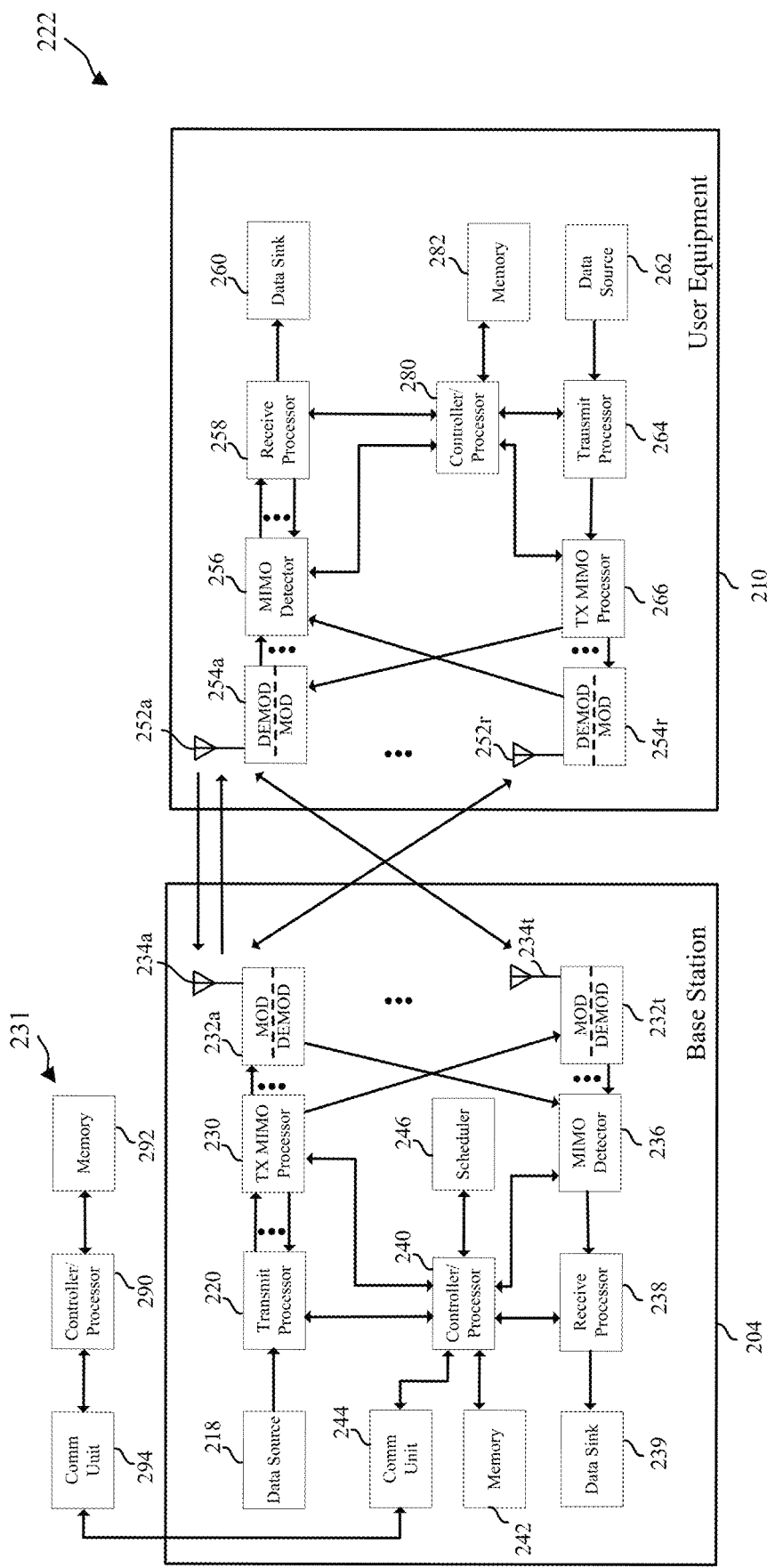
FIG. 2B is a diagram illustrating an example communication system including a user equipment communicating with a base station, according to aspects of the disclosure.

FIG. 2B shows a block diagram of a design of a base station 204 (e.g., network device 204 of FIG. 2A) and a UE 210 that enable transmission and processing of signals exchanged between the UE and the base station, in accordance with some aspects of the present disclosure. Design 222 includes components of a base station 204 and a UE 210. Base station 204 may be equipped with T antennas 234a through 234t, and UE 210 (or UE 205) may be equipped with R antennas 252a through 252r, where in general T≥1 and R≥1.

At base station 204, a transmit processor 220 may receive data from a data source 218 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, channel state information, channel state feedback, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 210, antennas 252a through 252r may receive the downlink signals from base station 204 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 210 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 210, a transmit processor 264 may receive and process data from a data source 262 and control information (e.g., for reports comprising RSRP, RSSI, RSRQ, CQI, channel state information, channel state feedback, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 204. At base station 204, the uplink signals from UE 210 and other UEs may be received by antennas 234a through 234t, processed by demodulators 232a through 232t, detected by a MIMO detector 236 if applicable, and further processed by a receive processor 238 to obtain decoded data and control information sent by UE 210. Receive processor 238 may provide the decoded data to a data sink 239 and the decoded control information to controller (processor) 240. Base station 204 may include communication unit 244 and communicate to a network controller 231 via communication unit 244. Network controller 231 may include communication unit 294, controller/processor 290, and memory 292.

In some aspects, one or more components of UE 210 may be included in a housing. Controller 240 of base station 204, controller/processor 280 of UE 210, and/or any other component(s) of FIG. 2B may perform one or more techniques associated with implicit uplink control information (UCI) beta value determination for NR.

Memories 242 and 282 may store data and program codes for the base station 204 and the UE 210, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

FIG. 3 illustrates a graphical representation of the large scale parameters 300. As mentioned above, examples of the LSP can include one or more of a delay spread (DS), angular spreads (ASA or angle spread of arrival, ASD or azimuth angel spread of departure, ZSA or zenith angle spread of arrival, ZSD or zenith angle spread of departure), Ricean K factor (K) and shadow facing (SF). The "PL" shown in FIG. 3 is a path loss that can be generated from K and SF. To compute the above LSPs from real world measurements, the following can be taken into consideration. Consider a small neighborhood of a given location. The system can extract all channel measurements (e.g., from different user equipment) from the neighborhood. For each measurement, the system can compute the LSPs including one or more of the DS, ASA, ZSA, ZSD, ASD and PL. For each LSP, the system can compute the mean and standard deviation. The $\mu_{LSP}$ and $\sigma_{LSP}$ values are the assigned parameters for the given location If one has access to $\{P_i, \tau_i, \phi_{arr,i}, \theta_{arr,i}, \theta_{dep,i}, \phi_{dep,i}\}$ for each path i comprising the channel, the LSPs can be computed as given by:

$$\sigma_x = \sqrt{\frac{\sum_i P_i(x_i - \bar{x})^2}{\sum_i P_i}}$$

where $$\bar{x} = \frac{\sum_i P_i x_i}{\sum_i P_i}$$

As an alternative, the parameter $P_i$ may be replaced by a complex amplitude $A_i$, $|A_i|=\sqrt{P_i}$ and the phase of $A_i$ may carry information on a carrier phase level. An overall channel condition for a location may be represented by a complex overall channel amplitude $A=\Sigma_i A_i \exp(j2\pi f \tau_i)$, which depends on the carrier frequency.

For each LSP, the system can predict the second order statistics for each parameter. For example, for DS, $x_i=\tau_i$, which is the delay of each part. For ASA, $x_i=\phi_{arr,\ i}$, which is the azimuth angle of arrival for that part; for ZSA, $x_i=\theta_{arr,\ i}$, which is the zenith angle of arrival; for ZSD, $x_i=\theta_{dep,\ i}$, which is the zenith angle of departure; for ASD, $x_i=\phi_{dep,\ i}$, which is the azimuth angle of departure; and PL is $\Sigma_i P_i$. The respective $\mu_{LSP}$ and $\sigma_{LSP}$ for each value are the assigned parameters for each location. The LSP parameters are the standard deviation or the power standard deviation of the values DS, ASA ZSA, ZSD, ASD and PL as computed above. Each path in a multipath scenario has a set of parameters.

Instead of the power for the power standard deviation for the PL, as noted above, the $P_i$ may be replaced by a complex amplitude and a phase value to carry information on a carrier phase level. In some cases, if one needs a composite channel, the data may not need to be a weighted average. Each path can utilize an alternative of using amplitude (which can be complex) and a composite channel (if needed in modeling), that can be a power weighted average and which can be represented by a complete overall channel amplitude which can depend on frequency as noted above. The alternative approaches may be used in some cases where certain parameters have other alternative approach or there may be other parameters besides the six parameters shown above which can be used to define or estimate a channel.

The first machine learning model 106 and/or the second machine learning model 203 can be transformers as discussed above. Aspects of this disclosure include the use of a promptable transformer design in which the "prompt" is a map (such as a building map combined with a height map) which is provided to a decoder of the transformer to be used to predict the LSP at all the map locations.

Figure 4:
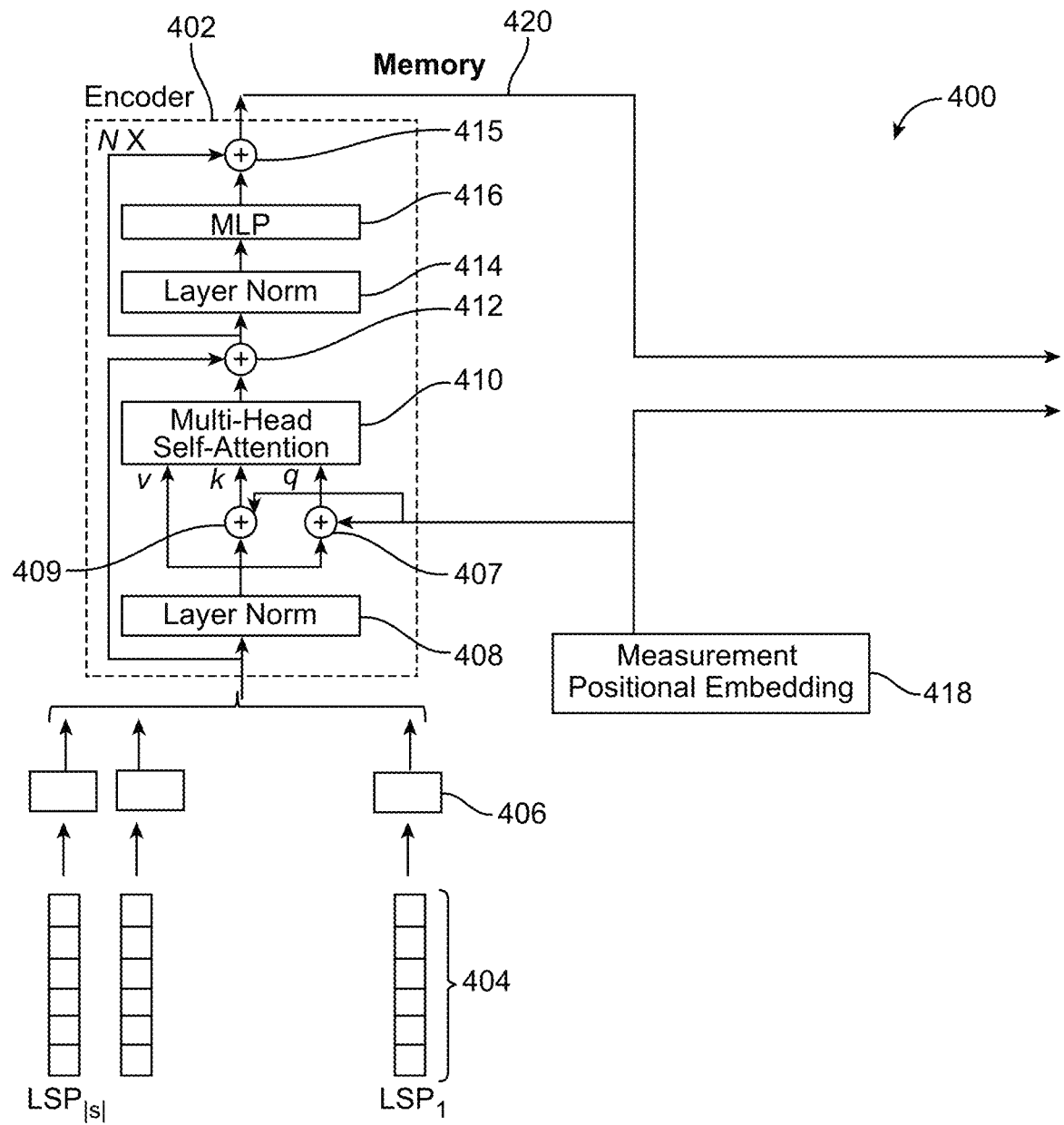
FIG. 4 is a diagram illustrating an example promptable transformer design, according to aspects of the disclosure.

FIG. 4 illustrates a promptable transformer design 400 with respect to an encoder 402. The encoder 402 can be included in a transformer (which also includes a decoder 502 shown in FIG. 5).

The encoder 402 can include two primary components: a self-attention mechanism (e.g., multi-head self-attention layer 410) and a feed-forward neural network (e.g., the multilayer perceptron (MLP) 416). The self-attention mechanism accepts input encodings from the previous encoder and weights their relevance to each other to generate output encodings. The feed-forward neural network further processes each output encoding individually. These output encodings are then passed to the next encoder as its input, as well as to the decoder (e.g., the decoder 502 shown in FIG. 5).

The encoder 402 can take positional information and embeddings 418 of the input sequence as its input. The positional information 418 is helpful for the transformer to make use of the order of the sequence, because no other part of the transformer makes use of this. The encoder 402 can be bidirectional. Attention can be placed on tokens before and after the current token.

The encoder 402 can receive one or more LSPs 404. The LSPs 404 can be computed from sparse real channel measurements 206. The transformer can be configured to interpolate/extrapolate over the sparse LSP measurements 206 using the map 202 as a guide or a "prompt" (e.g., see map 504 in FIG. 5). The measurement positional embedding 418 can be associated with the information about where the LSPs 404 were measured (e.g., the location of the UE 205 that provided the real measurements 206).

Figure 5:
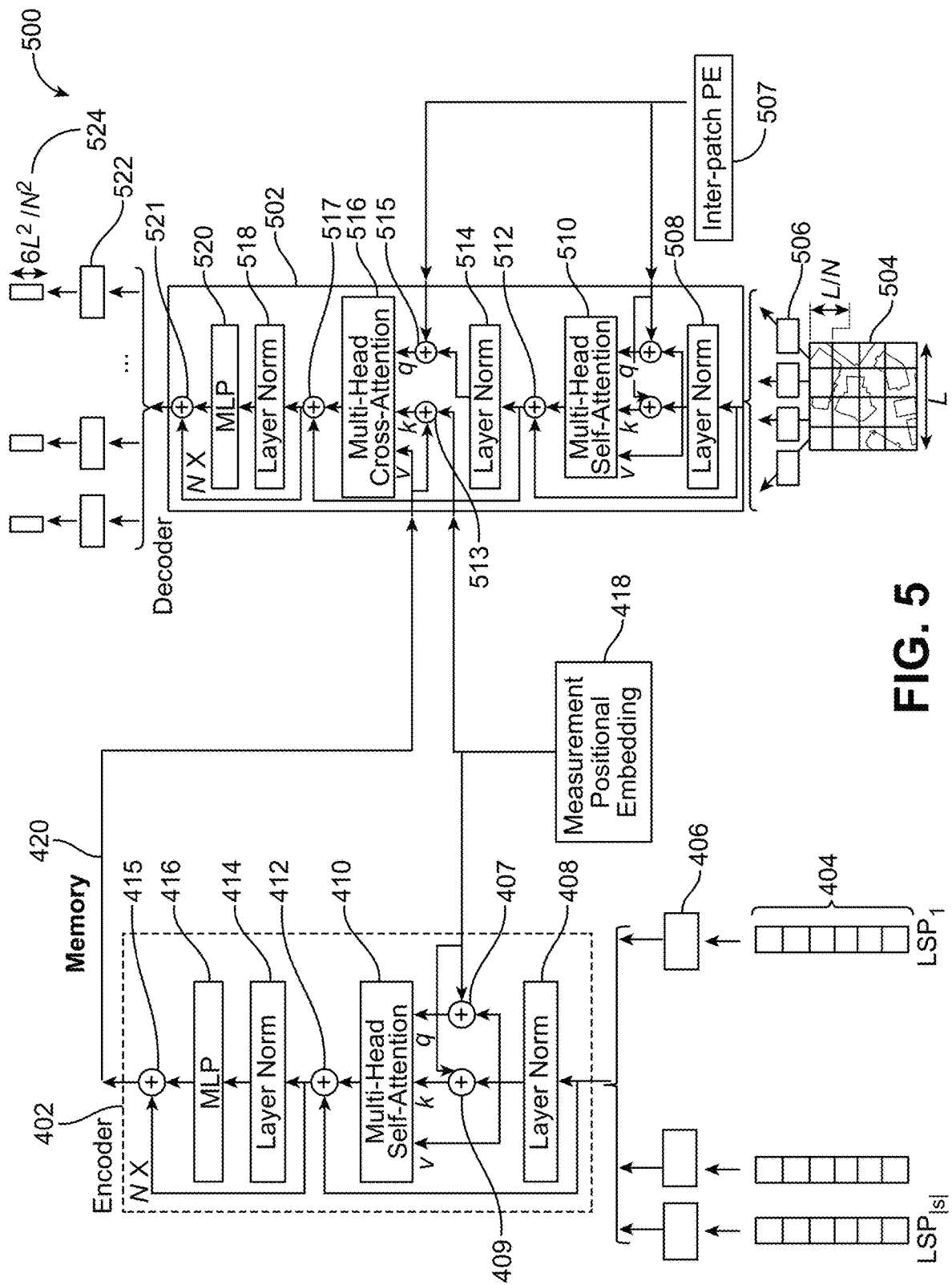
FIG. 5 is a diagram illustrating an example promptable transformer design, according to aspects of the disclosure.

The measurement positional embedding 418 can also be provided to a decoder (e.g., decoder 502 shown in FIG. 5). The measurement positional embedding 418 can include a grid-based measurement location and can use random Fourier features as described in Matthew Tancik et al. "Fourier features let networks learn high frequency functions in low dimensional domains", Adv. NIPS (2020), incorporated herein by reference to embed the grid-based measurement location.

The encoder 402 receives one input token per input LSP. The input token can be an embedding of an LSP vector (which can be any one of $LSP_1, LSP_2, \ldots LSP_{|S|}$) of the sparse LSPs 404. Each LSP vector can include one or more of values such as DS, ASA, ZSA, ZSD, ASD and PL as described above with respect to FIG. 3.

A first layer 406 represents a source linear projection of the one or more LSPs 404 to generate one input token per input LSP. A normalization layer 408 receives the input tokens and generates a "v" value, a "k" value which includes via adder 409 the measurement positional embedding 418 and a "q" value which includes via adder 407 the measurement positional embedding 418.

The machine learning model 106, 203 can in some aspects be configured using a transformer. A transformer generally is a deep learning architecture that relies on a parallel multi-head attention mechanism such as the multi-head self-attention layer 410 of FIG. 4. Transformers have been adopted for training large language models on large (language) datasets by virtue of the parallelized processing of input sequences. Input text is split into n-grams encoded as tokens and each token is converted into a vector via looking up from a word embedding table. At each layer, each token is then contextualized within the scope of the context window with other (unmasked) tokens via a parallel multi-head attention mechanism (see the multi-head self-attention layer 410) allowing the signal for key tokens to be amplified and less important tokens to be diminished.

The values v, k and q are shown as input to the multi-head self-attention layer 410. In some aspects, a set of ($W_Q$, $W_K$, $W_V$) matrices is called an attention head, and each layer in a transformer model can have multiple attention heads. While each attention head attends to the tokens that are relevant to each token, multiple attention heads allow the model to process data for different definitions of "relevance". In addition, an influence field representing relevance can become progressively dilated in successive layers. Many transformer attention heads encode relevance relations that are meaningful. For example, some attention heads can attend mostly to the next word or next value of data, while others mainly attend from verbs to their direct objects by way of example. The computations for each attention head can be performed in parallel, which allows for fast processing. The outputs for the attention layer are concatenated (see the adder 412 in FIG. 4) to pass the output into the feed-forward neural network layers (which can include the second normalization layer 414 and/or the MLP 416 introduced below).

In FIG. 4, the output of the multi-head self-attention layer 410 is added via adder 412 to the input tokens and provided to a second normalization layer 414, which output is processed by a multilayer perceptron (MLP) 416, which in some aspects can be a fully connected multi-layer neural network that can include three layers and one hidden layer. In some examples, the MLP 416 is an example of a feed-forward artificial neural network.

The output of the MLP 416 is added via adder 415 to the combination of the output of the multi-head self-attention layer 410 and the input to the first normalization layer 408 to generate the memory 420, which can be a vector of data. In some aspects, the memory 420 can be uploaded to a network server or to the network device 204 such that the UE 210 could download the memory 420. The UE 210 can then utilize the memory 420 to perform the operation of the decoder (shown in FIG. 5). The decoder uses the memory 420 and the map 504 as a prompt to ultimately generate the output data 524 (e.g., the LSP map 208).

FIG. 5 illustrates a promptable decoder 500 that receives the memory 420 from the encoder 402 and receives as input the measurement positional embedding 418. The promptable decoder 502 and encoder 402 can performs the following operations in transformer-based inference. The encoder 420 can embed each LSP 404 using an MLP 416. The UE location is utilized to compute a random Fourier feature based measurement positional embedding 418. The approach provides the LSP embedding 406 and measurement positional embedding 418 is provided as input to the encoder 402, which ultimately generates the memory 420. The decoder 502 uses the encoder output or the memory 420 in conjunction with an embedding of a building map 504 (e.g., the "prompt") to predict the LSP at all map locations in its output 524.

The building map 504 can represent a geographical map (centered around the base station of network device 103)) as a building and height map tuple. In one aspect, the approach is to divide the L×L map into $N^2$ patches. The approach can include embedding each patch and input the inter-patch positional embedding 507 to the decoder 502 as at least part of the query. A patch index can be utilized as query positional embedding. The inter-patch positional embedding 507 can be uses as learned positional embedding. The output 524 can correspond to each query patch that is passed through an MLP head 522. An output vector of the output 524 can be of size $6L^2/N^2$, or six LSPs for each of the $L^2/N^2$ pixels.

The architecture of FIG. 5 can be an improvement over a detection transformer (DETR) such as is disclosed in Nicolas Carion et al, "End-to-End Object Detection with Transformers", Computer Vision-ECCV, November 2020, incorporated herein by reference. In DETR, the input or object queries to the decoder is fixed. This disclosure instead enables the object queries to vary from inference to inference. Thus, the decoder is a "promptable" decoder 502 in that the map 504 can be used as a prompt to guide the processing of the data.

The input to the decoder 502 as noted includes the memory 420 output from the encoder 402 and the measurement positional embedding 418. The map 504 is also part of the input query processed via a query (map) projection 506 which output is provided to the first normalization layer 508 of the decoder 502. The output of the first normalization layer 508 is combined with an inter-patch positional embedding (PE) 507 and provided as v, k and q values to the multi-head self-attention layer 510. The output of the multi-head self-attention layer 510 is added 512 to the output of the query (map) projection 506 and then provided to the second normalization layer 514. The output of the second normalization layer 514 is added 515 to the inter-patch PE data 507 to generate q values.

The measurement PE 418 is added via an adder 513 to the memory 420 as k values. The memory 420 is input to the multi-head cross-attention layer 516 as v values. The v, k and q values are provided to the multi-head cross-attention layer 516 which output is added via adder 517 to the combination of the output of the multi-head self-attention layer 510 and the input to the first normalization layer 508 and provided to the third normalization layer 518. The output of the third normalization layer 518 is provided to the MLP layer 520 which output is added to the combination of the output of the multi-head cross-attention layer 516 and the combination of the output of the multi-head self-attention layer 510 and the input to the first normalization layer 508.

The output of the MLP 520 is added via adder 521 to the combination of the output of the multi-head cross-attention layer 516 and the combination of the output of the multi-head self-attention layer 510 and the input to the first normalization layer 508 to generate a decoder output that corresponds to each query patch that can be passed to a decoder MLP head 522.

A decoder MLP head 522 receives the output from the decoder 502 and generates an output 524 corresponding to each query patch that is passed to the decoder MLP head 522. An output vector from the decoder MLP head 522 can be the LSP map 208 that represents the predicted LSPs at the various locations of the map 202 and can have a size $6L^2/N^2$ and six LSPs (by way of example) for each of the $L^2/N^2$ pixels in the map 504. The map 504 represents the "prompt" for the transformer and to the decoder. The decoder 502 essentially has two inputs, the memory 420 and the map 504 which are used to generate the LSP map 208 (or the output 524).

As noted above, the "prompt" part of a promptable transformer design relates to the use of the map 504 as a prompt to the decoder 502 which can then utilize the vector associated with the memory 420 from the encoder 402 to generate the LSP map 208 via the output data 524. In a hybrid design, the memory 420 can be uploaded to a network server or to the network device 204. The UE 210 could then download the memory 420 and utilize the memory 420 and a received LSP map 524 to perform the operations of the decoder 502 to locally generate either an LSP map or a predicted LSP for the respective UE 210 location. The decoder 502 could be configured on the UE 210 to use the memory 420 and the map 524 as a prompt to ultimately generate the LSP map 208 or the specific predicted LSP for the UE 210 location.

Note that the map 504 can correspond to the map 202 which does not yet have the refined predict LSP values generated from the machine learning model 203. The decoder 502 being configured on the UE 210 in some aspects would then generate the LSP map 208 that was previously generated on the network device 204.

Masked autoencoders (MAE) are encoders that attempt to complete an LSP map without any conditional information. See, He, Kaiming, et al. "Masked autoencoders are scalable vision learners." Proc. IEEE/CVF CVPR. 2022, incorporated herein by reference. In MAE, there is an input image which can be a blurred out image, then the system operates to complete the image. MAE performs (unconditional) image inpainting. This disclosure utilizes the building and height map (e.g., map 202 or map 504) to perform conditional LSP map inpainting. In MAE, there is no conditional input. In the present disclosure, the transformer (e.g., encoder 402 and decoder 502) utilizes a prompt (i.e., the architecture is modified to accept map information or the map 504 as a condition) which can include a building map and a height map (by way of example) to perform conditional LSP map inpainting. DETR embeds the input image at the encoder and utilizes learnable query positional embeddings at the decoder to identify objects. In this disclosure, the concept is to embed measured LSPs at the encoder 402 and utilize map embedding (e.g., the map 504) as a query at decoder 502 to predict unmeasured LSPs 524.

In some aspects, the MAE approach masks random patches of the input images and reconstructs the missing pixels and thus does not provide a way to incorporate any conditioning information. In the present disclosure, the map 102, 202, 504 that can be used can include a building map plus a height map which was not considered in prior systems.

DETR sets a decoder query input to 0 and utilizes learnable query positional embeddings. These are fixed values. In contrast, the promptable transformer disclosed herein can embed the map 504 as a part of the query input and utilize the query PE 418 and/or the inter-patch PE 507 to indicate the index of the map patch corresponding to a given query embedding.

Another aspect of this disclosure relates to training. The training algorithm can train all the elements. Each element of each batch can include a varying number of LSP measurements, unlike the MAE training procedure referenced above which uses a fixed number of input image pixels. The disclosed system can use a variable amount of masking for each element in the batch. The approach enables the system to utilize the measurement information and the conditioning information. The system can compute a mean-square error (MSE) loss only on unmeasured predicted LSPs i.e., LSPs that were not part of the input set. Then the algorithm can utilize a randomized number of LSP measurements for training. Each batch can include a multitude of LSP measurement cardinalities.

In some aspects, a masked MSE can be utilized as a loss function. In this case, target LSPs can be computed from ray-traced data as noted above. The MSE can be computed only on the unmeasured locations i.e., on the locations that were not input to the encoder 402. In some aspects, one can randomly pick between three and thirty measured outdoor locations in a 64×64 map in each training epoch.

The map 102, 202, 504 can correlate to a (building M, height H) map tuple. When this structure is used, the building map can be a 0/1 map indicating absence/presence of a triangle coordinate in a pixel. The building map is what is illustrated in the map 102 of FIG. 1. A height map can include a height (z) coordinate of triangle in a pixel.

Part of the process can include a normalization process. Height maps can include each height map normalized using height of center pixel $h_c$ and $h_{max}$=54m (Building N) as $$\left(\frac{h - h_c}{h_{max}}\right).$$

For the LSPs, all LSPs can be normalized by min-max normalization. In another aspect, for a respective LSP x, the system can denote max over training set by $x_{M,train}$ and min by $x_{m,train}$. Then input data is of form $$\frac{x - x_{m,train}}{x_{M,train} - x_{m,train}}.$$

In some aspects, a performance metric can include an RMSE value for each LSP on outdoor locations.

In another aspect, there can be various approaches to training an LSP transformer. The overall objective is, given the LSP measurements 206 at a sparse set of locations, how can the system learn a map guided LSP interpolation and extrapolation. In one example, a large dataset of (fully observed) real world data and maps such as (building, LSP) maps can be used. The approach may be to split the dataset between the training stage and the validation or testing stage. The test data set may be in this case be a fully observed data set and real (building, LSP) maps. The approach can be to train on real data from a given map and assume a small set of LSP measurements and the building map as input. One can train the model (i.e., a neural network (NN)) to complete the LSP map. With reference to FIG. 1, the building map can be the map 102 and the small set of real LSP measurements (e.g., (LSP$_1$ ($x_1$, $y_1$)) . . . (LSP$_{ISI}$, ($x_{ISI}$, $y_{ISI}$)) can represent the measurements 108 which are provided to the machine learning model 106 (again, which can be a NN or transformer as well). The output can be the LSP maps 112. Then, in a testing stage on real data, one can input a small set of LSP measurements (e.g., measurements 206) and the building map, and the machine learning model 203 can output the complete LSP map 208.

Another approach to training an LSP transformer can include using a large dataset of fully observed simulation data (e.g., from ray-tracing) and to generate the building and LSP maps. The data can be split into to two portions. The approach can include training on the simulated data for a given map as shown in FIG. 1 and then can utilize or obtain a small set of LSP measurements and the building map as input for completing the training of the machine leaning model to complete the LSP map. The approach as shown in FIG. 2A can finetune the model on real data in which the machine learning or neural network weights are finetuned on the small real-world dataset. Another step could include testing on real-input from a small set of LSP measurements and the building map to generate the machine learning model output of a complete LSP map.

In one aspect, an apparatus can include at least one memory and at least one processor coupled to at least one memory and configured to: obtain sparse LSP measurements at an encoder of a transformer; obtain a positional embedding identifying locations of the sparse LSP measurements; generate a memory or a dataset; receive the dataset at a decoder; receive a map tuple (e.g., such as a building and height map tuple) as a prompt to the decoder; and output, using the map tuple as a guide and from the decoder, a complete LSP map for a geographic are.

Figure 6:
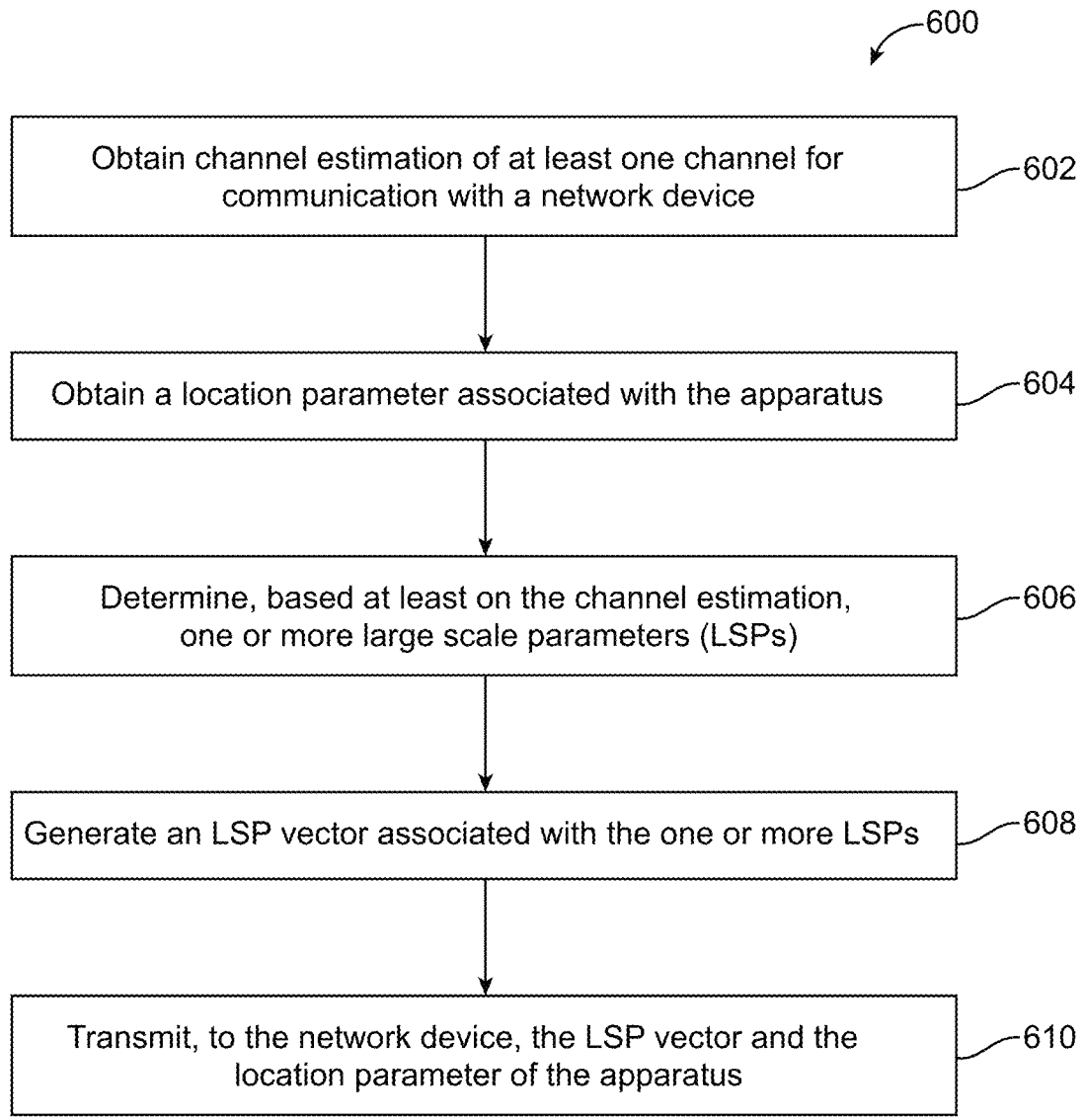
FIG. 6 illustrates a process for performing wireless communication, according to aspects of the disclosure.

FIG. 6 illustrates an example of a process 600 for communicating with a wireless device (e.g., as described with respect to FIG. 2A which can include a network device 204 or a user equipment 210 or user equipment 205). At block 602, the process 600 can include obtaining channel estimation of at least one channel for communication with a network device.

At block 604, the process 600 can include obtaining a location parameter associated with the apparatus.

At block 606, the process 600 can include determining, based at least on the channel estimation, one or more large scale parameters (LSPs);

At block 608, the process 600 can include generating an LSP vector associated with the one or more LSPs.

At block 610, the process 600 can include transmitting, to the network device, the LSP vector and the location parameter of the apparatus.

At least one LSP of the one or more LSPs can include at least one of a path loss (PL) of the channel estimation, a delay spread (DS) of the channel estimation, an angular spread of the channel estimation, a Ricean K factor (K) and a shadow fading (SF). In some aspects, the angular spread can include at least one of an azimuth angular spread of arrival (ASA), an azimuth angular spread of departure (ASD), a zenith angular spread of arrival (ZSA), or a zenith angle spread of departure (ZSD).

The process 600 can further include determining, based at least on the channel estimation, the one or more LSPs using a promptable decoder that receives a measurement positional embedding and a map as part of a query to the promptable decoder. The promptable decoder can be configured to accept a different query input during each inference. The promptable decoder can receive an inter-patch positioning embedding and utilize the map in the query to indicate an index of a map patch correspondence to a given query embedding. The promptable decoder is configured to utilize a building and height map to perform conditional LSP map inpainting. In another aspect, the promptable decoder can be configured to receive embedded measured LSPs from an encoder and receive the building and height map as a map embedding to predict unmeasured LSPs or the promptable decoder can be trained utilizing a varying number of LSP measurements.

In another aspect, the process 600 can include determining, based at least on the channel estimation, the one or more LSPs based on a conditional LSP map inpainting using a building and height map.

In another aspect, the process 600 can include determining, based at least on the channel estimation, the one or more LSPs by computing a mean squared error loss only on unmeasured predicted LSPs that are not part of an input set.

A mean-square error loss as part of a training process for the promptable decoder can only computed on unmeasured predicted LSPs. The promptable decoder can be trained utilizing a randomized number of LSP measurements.

Figure 7:
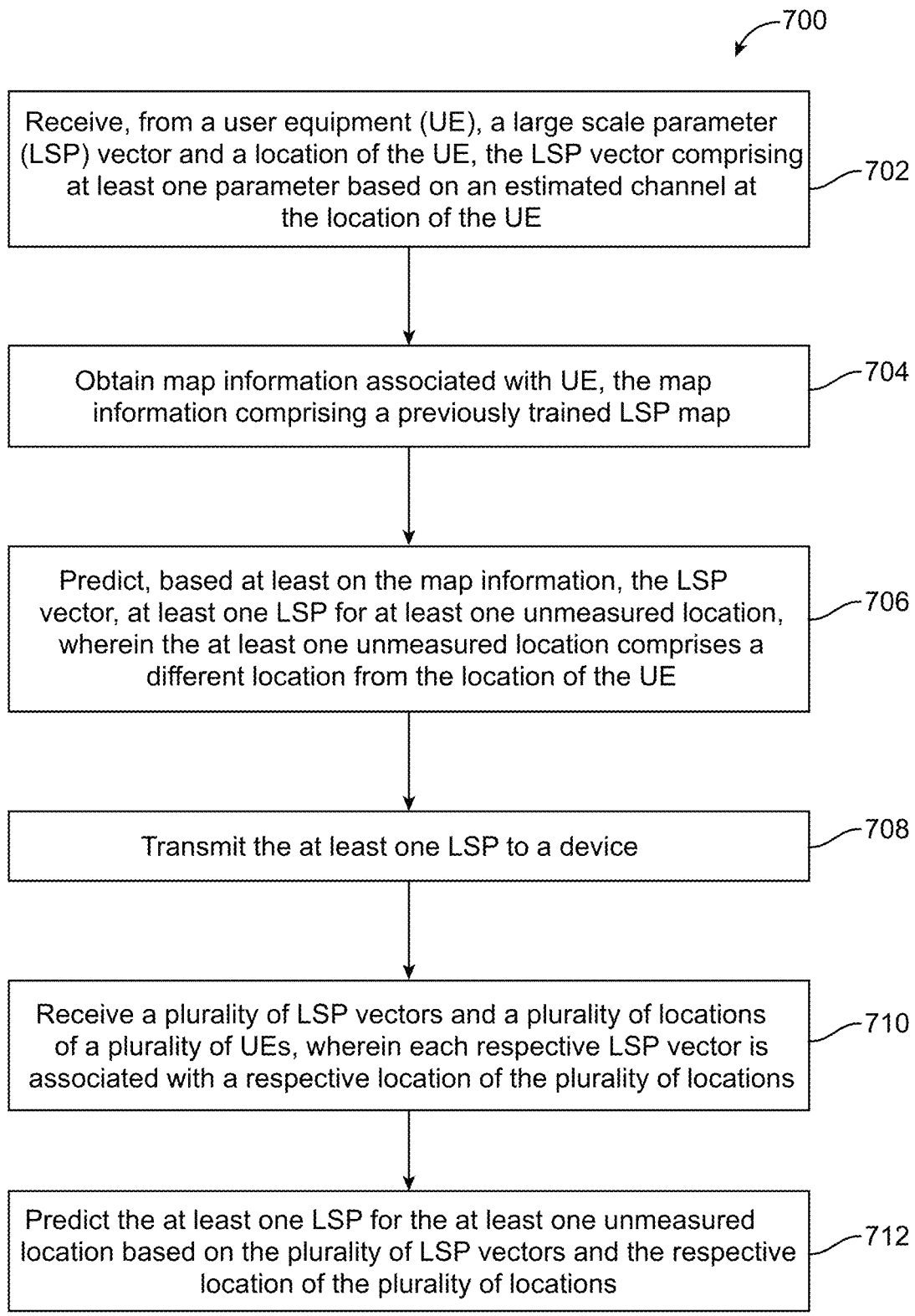
FIG. 7 illustrates a process for performing wireless communication, according to aspects of the disclosure.

FIG. 7 illustrates an example of a process 700 for communicating with a network device (e.g., as described with respect to FIG. 2A which can include a network device 204 or a user equipment 210 or user equipment 205). At block 702, the process 700 can include receiving, from a user equipment (UE), a large scale parameter (LSP) vector and a location of the UE, the LSP vector comprising at least one parameter based on an estimated channel at the location of the UE.

At block 704, the process 700 can include obtaining map information associated with UE, the map information comprising a previously trained LSP map.

At block 706, the process 700 can include predicting, based at least on the map information, the LSP vector, at least one LSP for at least one unmeasured location, wherein the at least one unmeasured location comprises a different location from the location of the UE At block 708, the process 700 can include transmitting the at least one LSP to a device.

At block 710, the process 700 can include receiving a plurality of LSP vectors and a plurality of locations of a plurality of UEs, wherein each respective LSP vector is associated with a respective location of the plurality of locations At block 712, the process 700 can include predicting the at least one LSP for the at least one unmeasured location based on the plurality of LSP vectors and the respective location of the plurality of locations.

At least one LSP of the LSP vector can include at least one of a path loss (PL) of the channel estimation, a delay spread (DS) of the channel estimation, an angular spread of the channel estimation, a Ricean K factor (K) and a shadow fading (SF). The angular spread can include at least one of an azimuth angular spread of arrival (ASA), an azimuth angular spread of departure (ASD), a zenith angular spread of arrival (ZSA), or a zenith angle spread of departure (ZSD).

The process 700 can further include predicting the at least one LSP using a prediction model trained using one or more maps as queries and LSP vectors from measured UE locations.

In some aspects, the process 700 can include finetuning the prediction model based on a plurality of LSP vectors and a plurality of locations of a plurality of UEs to generate a finetuned prediction model. The trained prediction model and the finetuned prediction model can include at least one transformer neural network. The process 700 can further include receiving, from at least one additional UE, a respective location of the at least one additional UE and outputting, for transmission to at least one additional UE, a respective predicted large scale parameter (LSP) vector for the respective location of the at least one additional UE.

Figure 8:
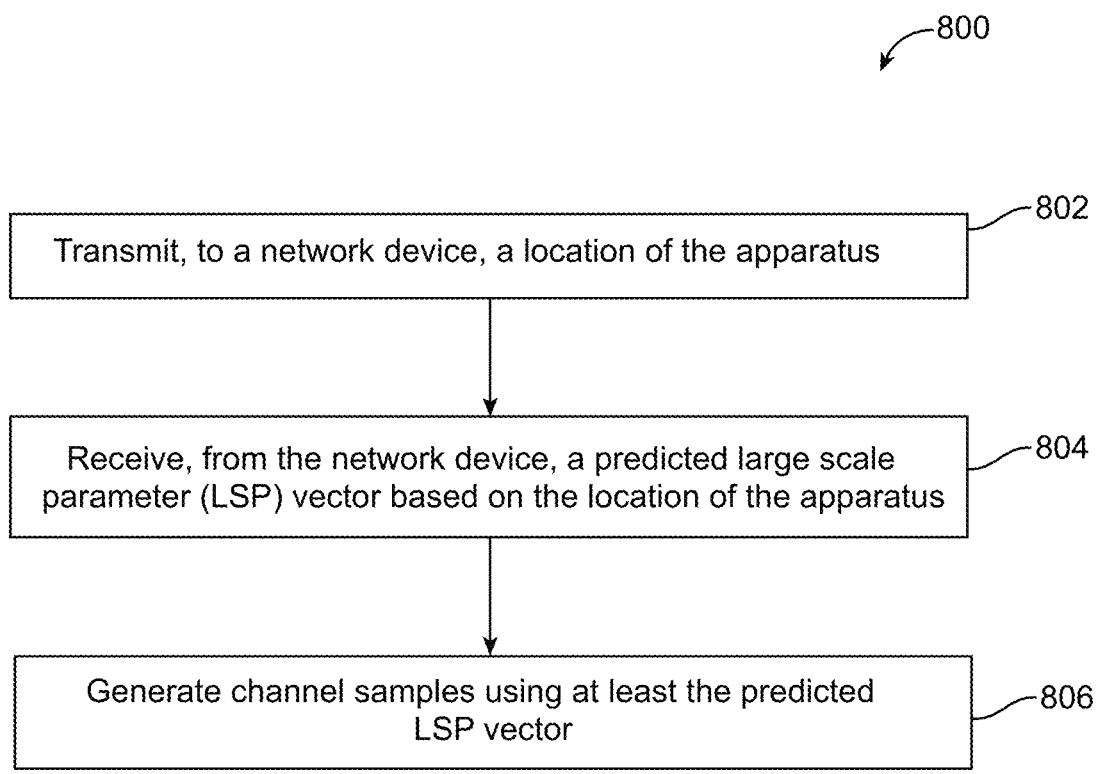
FIG. 8 illustrates a process for generating channel samples, according to aspects of the disclosure.

FIG. 8 illustrates an example process 800 for performing wireless communication. The wireless communication can be between a user equipment and a network device (e.g., as described with respect to FIG. 2A which can include a network device 204 or a user equipment 210 or user equipment 205).

At block 802, the process 800 can include transmitting, to a network device, a location of the apparatus.

At block 804, the process 800 can include receiving, from the network device, a predicted large scale parameter (LSP) vector based on the location of the apparatus At block 806, the process 800 can include generating channel samples using at least the predicted LSP vector.

The process 800 can further include performing, based on the channel samples, reference signal optimization. An apparatus can be a user equipment (UE) 205, 210 for use with the process 800.

At least one LSP of the predicted LSP vector can include at least one of a path loss (PL) of a channel estimation, a delay spread (DS) of the channel estimation, an angular spread of the channel estimation, a Ricean K factor (K) and a shadow fading (SF). The angular spread can include at least one of an azimuth angular spread of arrival (ASA), an azimuth angular spread of departure (ASD), a zenith angular spread of arrival (ZSA), or a zenith angel spread of departure (ZSD).

The process 800 can further include processing the predicted LSP vector using a generative channel model (GCM) to generate the channel samples.

Figure 9:
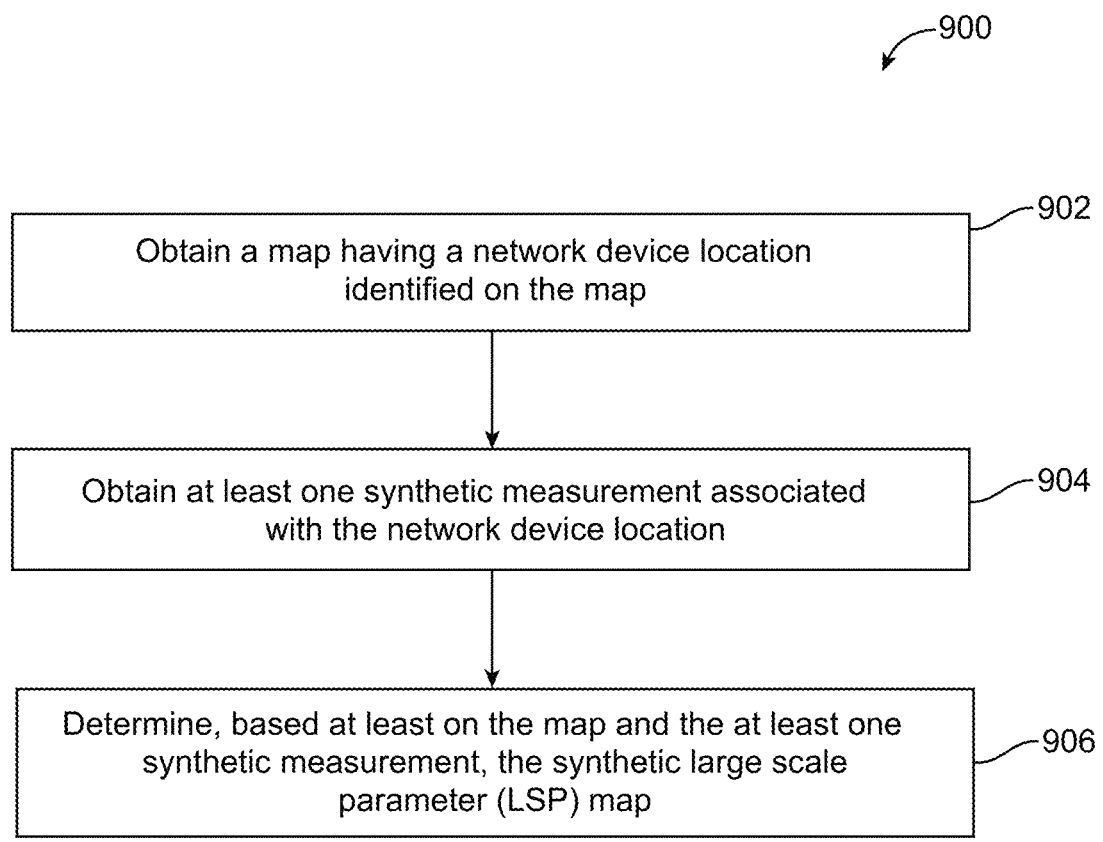
FIG. 9 illustrates a process for determining a large scale parameter map, according to aspects of the disclosure.

FIG. 9 illustrates a process 900 for generating a synthetic large scale parameter map. The use of the synthetic large scale parameter map can be in connect with a network device (e.g., as described with respect to FIG. 2A which can include a network device 204 or user equipment 210 or user equipment 205).

At block 902, the process 900 can include obtaining a map having a network device location identified on the map.

At block 904, the process 900 can include obtaining at least one synthetic measurement associated with the network device location.

At block 906, the process can include determining, based at least on the map and the at least one synthetic measurement, the synthetic large scale parameter (LSP) map. The at least one synthetic measurement can include a plurality of synthetic measurements. The at least one synthetic measurement can include at least one LSP, wherein the at least one LSP comprises at least one of a path loss (PL) of a channel estimation, a delay spread (DS) of the channel estimation, an angular spread of the channel estimation, a Ricean K factor (K) and a shadow fading (SF).

Figure 10:
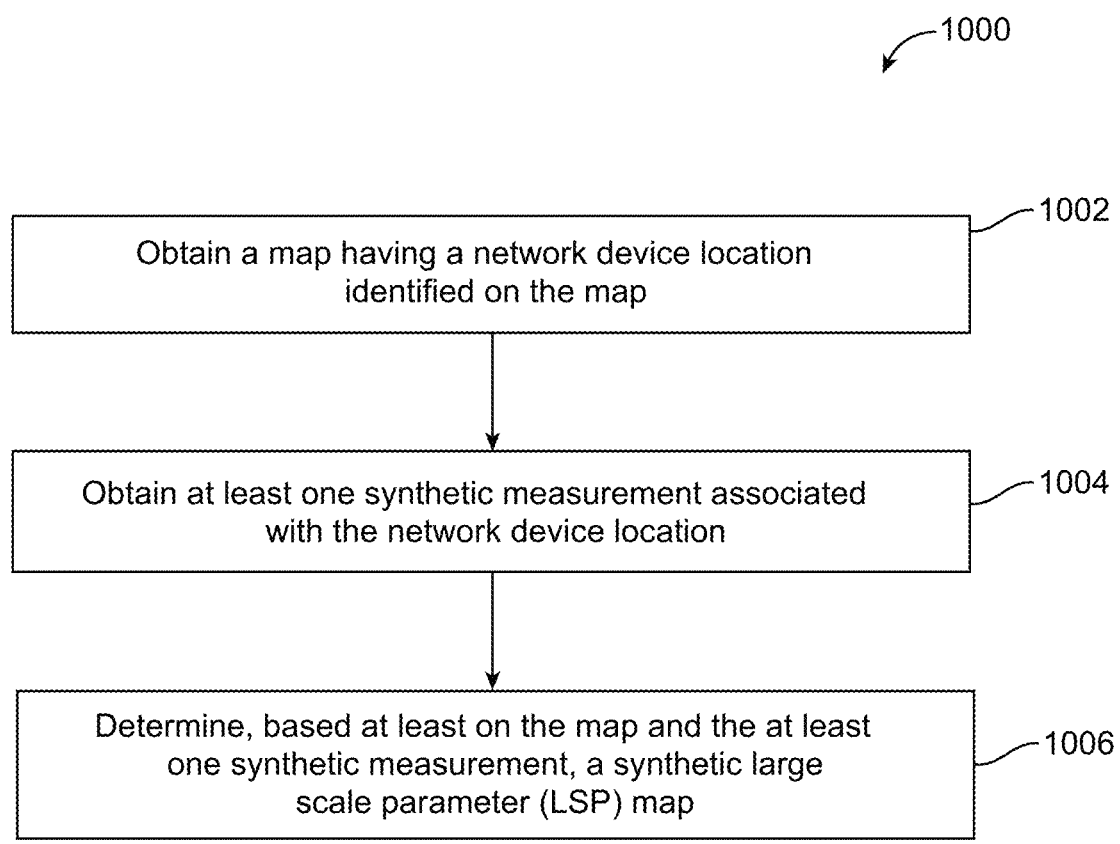
FIG. 10 illustrates a process for generating a synthetic large scale parameter map, according to aspects of the disclosure.

FIG. 10 illustrates a process 1000 for generating a synthetic large scale parameter map. The use of the synthetic large scale parameter map can be in connect with a network device (e.g., as described with respect to FIG. 2A which can include a network device 204 or user equipment 210 or user equipment 205).

At block 1002, the process 1000 can include obtaining a map having a network device location identified on the map.

At block 1004, the process 1000 can include obtaining at least one synthetic measurement associated with the network device location.

At block 1006, the process 1000 can include determining, based at least on the map and the at least one synthetic measurement, a synthetic large scale parameter (LSP) map.

The at least one synthetic measurement can include a plurality of synthetic measurements. The at least one synthetic measurement can include at least one LSP, wherein the at least one LSP comprises at least one of a path loss (PL) of a channel estimation, a delay spread (DS) of the channel estimation, an angular spread of the channel estimation, a Ricean K factor (K) and a shadow fading (SF).

Figure 11:
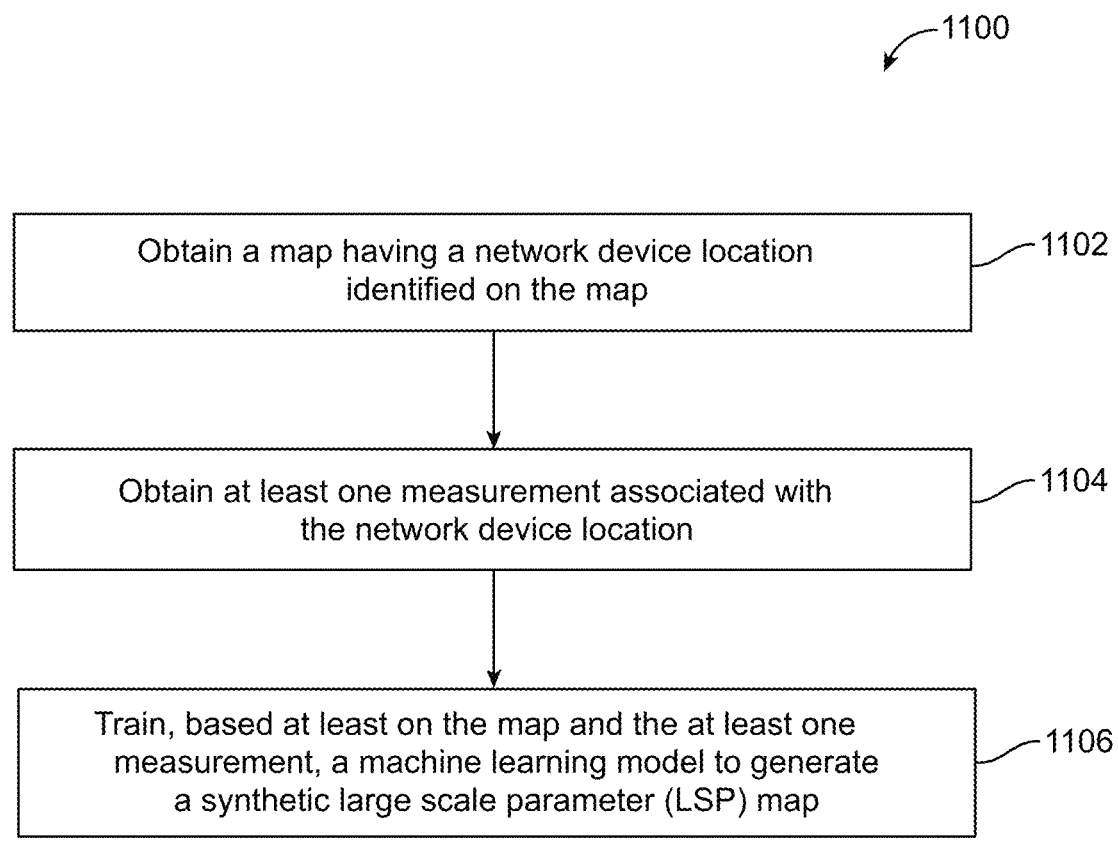
FIG. 11 illustrates a process for generating a synthetic large scale parameter map, according to aspects of the disclosure.

FIG. 11 illustrates a process 1100 for generating a synthetic large scale parameter map. The use of the synthetic large scale parameter map can be in connect with a network device (e.g., as described with respect to FIG. 2A which can include a network device 204 or user equipment 210 or user equipment 205).

At block 1102, the process 1100 can include obtaining a map having a network device location identified on the map.

At block 1104, the process 1100 can include obtaining at least one measurement associated with the network device location.

At block 1106, the process 1100 can include training, based at least on the map and the at least one measurement, a machine learning model to generate a synthetic large scale parameter (LSP) map.

The at least one measurement can include a plurality of measurements. The at least one measurement can include one of at least one synthetic measurement or at least one real measurement. When the at least one measurement includes at least one large scale parameter (LSP), the at least one LSP includes at least one of a path loss (PL) of a channel estimation, a delay spread (DS) of the channel estimation, an angular spread of the channel estimation, a Ricean K factor (K) and a shadow fading (SF).

Figure 12:
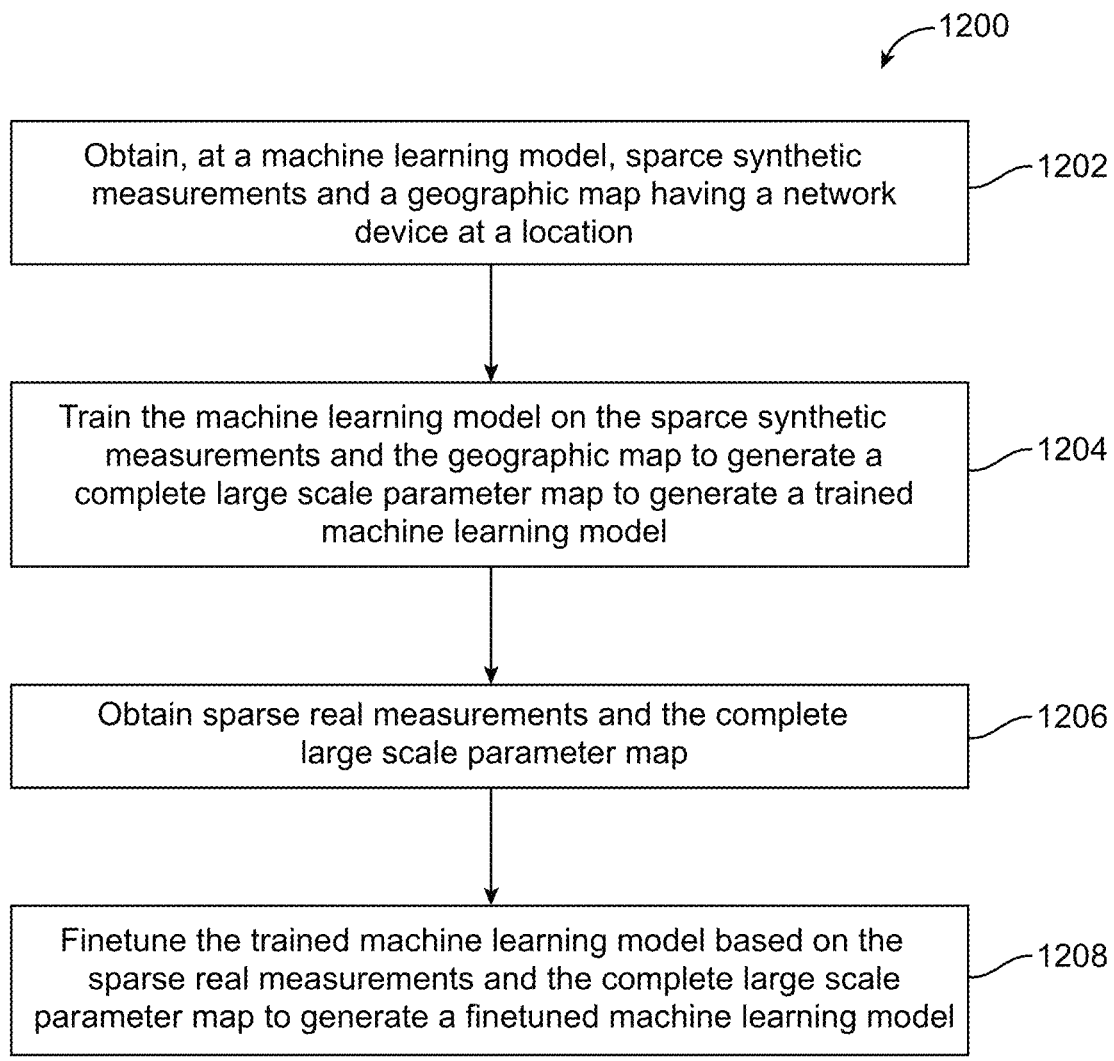
FIG. 12 illustrates a process for training a machine learning model, according to aspects of the disclosure.

FIG. 12 illustrates a process 1200 of training a machine learning model to generate a large scale parameter map for a geographic area. The use of the synthetic large scale parameter map can be in connect with a network device (e.g., as described with respect to FIG. 2A which can include a network device 204 or user equipment 210 or user equipment 205).

At block 1202, the process can include obtaining, at a machine learning model, sparse synthetic measurements and a geographic map having a network device at a location.

At block 1204, the process 1200 can include training the machine learning model on the sparse synthetic measurements and the geographic map to generate a complete large scale parameter map to generate a trained machine learning model.

At block 1206, the process 1200 can include obtaining sparse real measurements and the complete large scale parameter map.

At block 1208, the process 1200 can include finetuning the trained machine learning model based on the sparse real measurements and the complete large scale parameter map to generate a finetuned machine learning model.

The machine learning model can include a transformer neural network having an encoder 402 and a decoder 502 in which the decoder 502 receives one or more geographic map as an input or a prompt to the decoder 502. The one or more geographic maps can include information about a mapped region and can be one or more of a three-dimensional map, a building map and a height map.

In some aspects, the processes described herein (e.g., process 600, 700, 800, 900, 1000, 1100, 1200 and/or other process described herein) may be performed by a computing device or apparatus or a component or system (e.g., a chipset, one or more processors (e.g., central processing unit (CPU), graphics processing unit (GPU), neural processing unit (NPU), digital signal processor (DSP), etc.), ML system such as a neural network model, etc.) of the computing device or apparatus. The computing device or apparatus may be a vehicle or component or system of a vehicle, a mobile device (e.g., a mobile phone), a network-connected wearable such as a watch, an extended reality (XR) device (e.g., a virtual reality (VR) device, augmented reality (AR) device, and/or mixed reality (MR) device), or other type of computing device. In some cases, the computing device or apparatus can be the computing system 1300 of FIG. 13, a vehicle, and/or other computing device or apparatus.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 600, 700, 800, 900, 1000, 1100, 1200 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s)

that are configured to carry out the steps of processes described herein. In some aspects, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. In some aspects, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The processes 600, 700, 800, 900, 1000, 1100, 1200 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 600, 700, 800, 900, 1000, 1100, 1200, method and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
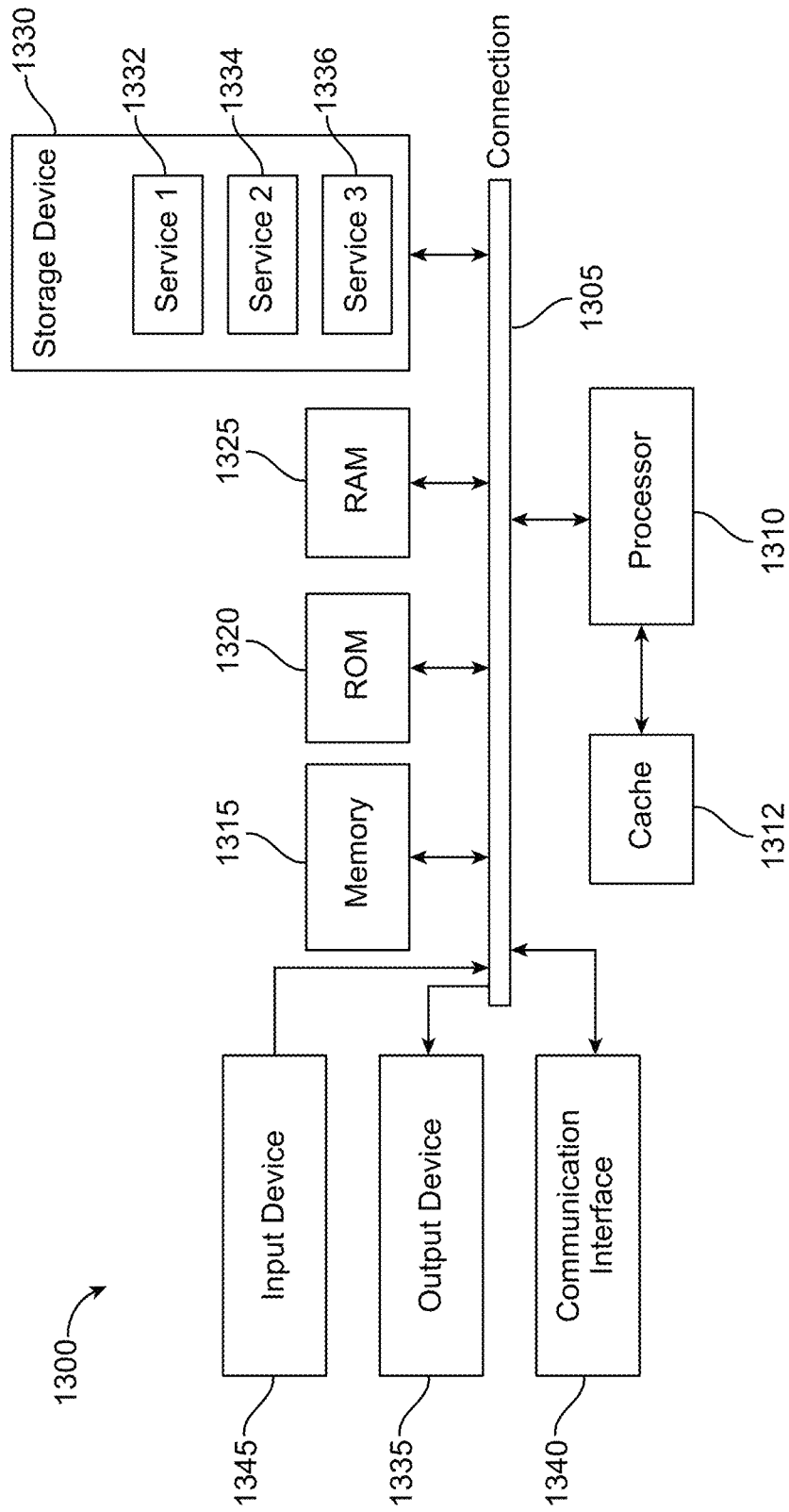
FIG. 13 is a diagram illustrating an example of a computing system, according to aspects of the disclosure.

FIG. 13 is a diagram illustrating a system for implementing certain aspects of the present technology. In particular, FIG. 13 illustrates a computing system 1300, which can be any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

The system 1300 includes at least one processing unit (CPU or processor) 1310 and connection 1305 that couples various system components including system memory 1315, such as read-only memory (ROM) 1320 and random-access memory (RAM) 1325 to processor 1310. Computing system 1300 can include a cache 1311 of high-speed memory connected directly with, in close proximity to, or integrated as part of processor 1310.

Processor 1310 can include any general-purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more GNSS receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, the code causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Figure 14:
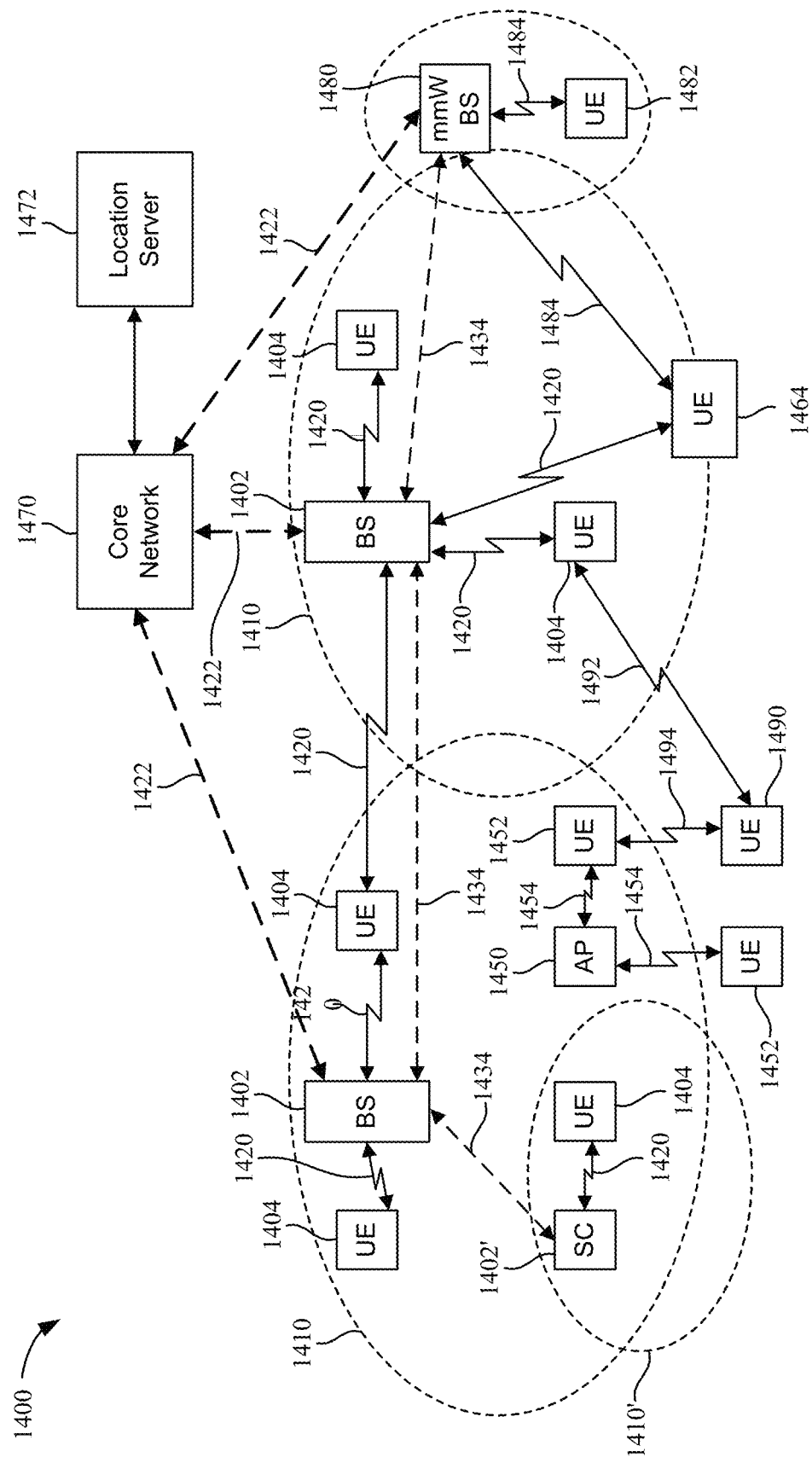
FIG. 14 illustrates an exemplary wireless communications system, according to aspects of the disclosure.

According to various aspects, FIG. 14 illustrates an exemplary wireless communications system 1400. The wireless communications system 1400 (which may also be referred to as a wireless wide area network (WWAN)) can include various base stations 1402 and various UEs 1404. In some aspects, the base stations 1402 may also be referred to as "network entities" or "network nodes." One or more of the base stations 1402 can be implemented in an aggregated or monolithic base station architecture. Additionally or alternatively, one or more of the base stations 1402 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 1402 can include macro cell base stations (high power cellular base stations) and/or small cell base stations (low power cellular base stations). In an aspect, the macro cell base station may include eNBs and/or ng-eNBs where the wireless communications system 1400 corresponds to a long term evolution (LTE) network, or gNBs where the wireless communications system 1400 corresponds to a NR network, or a combination of both, and the small cell base stations may include femtocells, picocells, microcells, etc.

The base stations 1402 may collectively form a RAN and interface with a core network 1470 (e.g., an evolved packet core (EPC) or a 5G core (5GC)) through backhaul links 1422, and through the core network 1470 to one or more location servers 1472 (which may be part of core network 1470 or may be external to core network 1470). In addition to other functions, the base stations 1402 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 1402 may communicate with each other directly or indirectly (e.g., through the EPC or 5GC) over backhaul links 1434, which may be wired and/or wireless.

The base stations 1402 may wirelessly communicate with the UEs 1404. Each of the base stations 1402 may provide communication coverage for a respective geographic coverage area 1410. In an aspect, one or more cells may be supported by a base station 1402 in each coverage area 1410. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 1410.

While neighboring macro cell base station 1402 geographic coverage areas 1410 may partially overlap (e.g., in a handover region), some of the geographic coverage areas 1410 may be substantially overlapped by a larger geographic coverage area 1410. For example, a small cell base station 1402' may have a coverage area 1410' that substantially overlaps with the coverage area 1410 of one or more macro cell base stations 1402. A network that includes both small cell and macro cell base stations may be known as a heterogeneous network. A heterogeneous network may also include home eNBs (HeNBs), which may provide service to a restricted group known as a closed subscriber group (CSG).

The communication links 1420 between the base stations 1402 and the UEs 1404 may include uplink (also referred to as reverse link) transmissions from a UE 1404 to a base station 1402 and/or downlink (also referred to as forward link) transmissions from a base station 1402 to a UE 1404. The communication links 1420 may use MIMO antenna technology, including spatial multiplexing, beamforming, and/or transmit diversity. The communication links 1420 may be through one or more carrier frequencies. Allocation of carriers may be asymmetric with respect to downlink and uplink (e.g., more or less carriers may be allocated for downlink than for uplink).

The wireless communications system 1400 may further include a WLAN AP 1450 in communication with WLAN stations (STAs) 1452 via communication links 1454 in an unlicensed frequency spectrum (e.g., 5 Gigahertz (GHz)). When communicating in an unlicensed frequency spectrum, the WLAN STAs 1452 and/or the WLAN AP 1450 may perform a clear channel assessment (CCA) or listen before talk (LBT) procedure prior to communicating in order to determine whether the channel is available. In some examples, the wireless communications system 1400 can include devices (e.g., UEs, etc.) that communicate with one or more UEs 1404, base stations 1402, APs 1450, etc. utilizing the ultra-wideband (UWB) spectrum. The UWB spectrum can range from 3.1 to 10.5 GHz.

The small cell base station 1402' may operate in a licensed and/or an unlicensed frequency spectrum. When operating in an unlicensed frequency spectrum, the small cell base station 1402' may employ LTE or NR technology and use the same 5 GHz unlicensed frequency spectrum as used by the WLAN AP 1450. The small cell base station 1402', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 1400 may further include a millimeter wave (mmW) base station 1480 that may operate in mmW frequencies and/or near mmW frequencies in communication with a UE 1482. The mmW base station 1480 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 1480 and the UE 1482 may utilize beamforming (transmit and/or receive) over an mmW communication link 1484 to compensate for the extremely high path loss and short range. Further, it will be appreciated that in alternative configurations, one or more base stations 1402 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 1402/1480, UEs 1404/1482) operate is divided into multiple frequency ranges, FR1 (from 450 to 6000 Megahertz (MHz)), FR2 (from 24250 to 52600 MHZ), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 1404/1482 and the cell in which the UE 1404/1482 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 1404 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 1404/1482 in a cell may have different downlink primary carriers. The same is true for the uplink primary carriers. The network is able to change the primary carrier of any UE 1404/1482 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 14, one of the frequencies utilized by the macro cell base stations 1402 may be an anchor carrier (or "PCell") and other frequencies utilized by the macro cell base stations 1402 and/or the mmW base station 1480 may be secondary carriers ("SCells"). In carrier aggregation, the base stations 1402 and/or the UEs 1404 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 1404/1482 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

In order to operate on multiple carrier frequencies, a base station 1402 and/or a UE 1404 is equipped with multiple receivers and/or transmitters. For example, a UE 1404 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 1404 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 1404 is being served in band 'X' or band 'Y,' because of the separate "Receiver 2," the UE 1404 can measure band 'Z' without interrupting the service on band 'X' or band 'Y.'

The wireless communications system 1400 may further include a UE 1464 that may communicate with a macro cell base station 1402 over a communication link 1420 and/or the mmW base station 1480 over an mmW communication link 1484. For example, the macro cell base station 1402 may support a PCell and one or more SCells for the UE 1464 and the mmW base station 1480 may support one or more SCells for the UE 1464.

The wireless communications system 1400 may further include one or more UEs, such as UE 1490, that connects indirectly to one or more communication networks via one or more device-to-device (D2D) peer-to-peer (P2P) links (referred to as "sidelinks"). In the example of FIG. 14, UE 1490 has a D2D P2P link 1492 with one of the UEs 1404 connected to one of the base stations 1402 (e.g., through which UE 1490 may indirectly obtain cellular connectivity) and a D2D P2P link 1494 with WLAN STA 1452 connected to the WLAN AP 1450 (through which UE 1490 may indirectly obtain WLAN-based Internet connectivity). In an example, the D2D P2P links 1492 and 1494 may be supported with any well-known D2D RAT, such as LTE Direct (LTE-D), Wi-Fi Direct (Wi-Fi-D), Bluetooth®, and so on.

Figure 15:
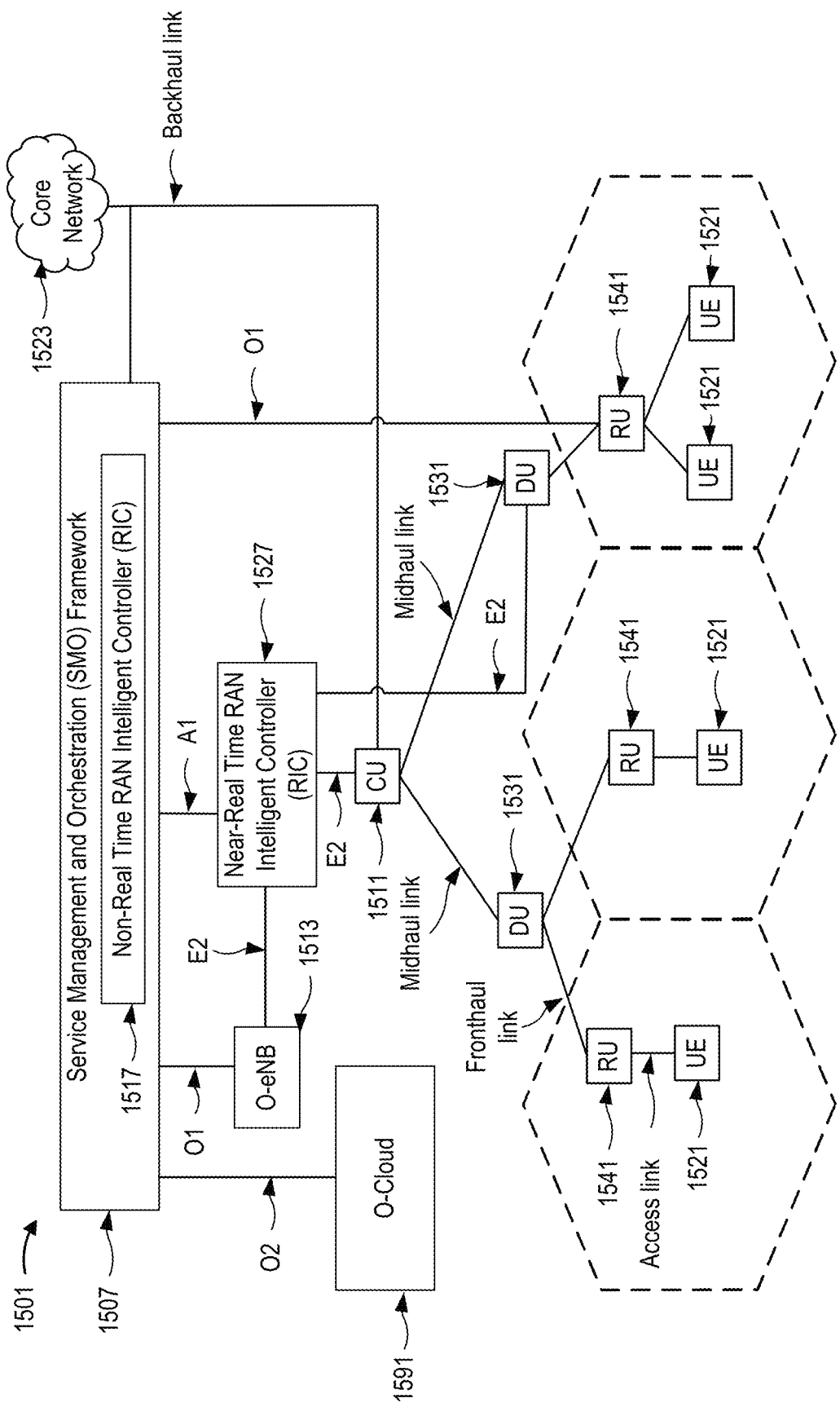
FIG. 15 is a diagram illustrating an example of a disaggregated base station architecture, according to aspects of the disclosure.

FIG. 15 is a diagram illustrating an example of a disaggregated base station architecture, which may be employed by the disclosed system for sensor sharing via Uu communications. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 15 shows a diagram illustrating an example disaggregated base station 1501 architecture. The disaggregated base station 1501 architecture may include one or more central units (CUs) 1511 that can communicate directly with a core network 1523 via a backhaul link, or indirectly with the core network 1523 through one or more disaggregated base station units (such as a Near-Real Time (Near-RT) RAN Intelligent Controller (RIC) 1527 via an E2 link, or a Non-Real Time (Non-RT) RIC 1517 associated with a Service Management and Orchestration (SMO) Framework 1507, or both). A CU 1511 may communicate with one or more distributed units (DUs) 1531 via respective midhaul links, such as an F1 interface. The DUs 1531 may communicate with one or more radio units (RUS) 1541 via respective fronthaul links. The RUs 1541 may communicate with respective UEs 1521 via one or more RF access links. In some implementations, the UE 1521 may be simultaneously served by multiple RUs 1541.

Each of the units, i.e., the CUS 1511, the DUs 1531, the RUs 1541, as well as the Near-RT RICs 1527, the Non-RT RICs 1517 and the SMO Framework 1507, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1511 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1511. The CU 1511 may be configured to handle user plane functionality (i.e., Central Unit-User Plane (CU-UP)), control plane functionality (i.e., Central Unit-Control Plane (CU-CP)), or a combination thereof. In some implementations, the CU 1511 can be logically split into one or more CU-UP units and one or more CU-CP units. The CU-UP unit can communicate bidirectionally with the CU-CP unit via an interface, such as the E1 interface when implemented in an O-RAN configuration. The CU 1511 can be implemented to communicate with the DU 131, as necessary, for network control and signaling.

The DU 1531 may correspond to a logical unit that includes one or more base station functions to control the operation of one or more RUs 1541. In some aspects, the DU 1531 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1531 may further host one or more low PHY layers. Each layer (or module) can be implemented with an interface configured to communicate signals with other layers (and modules) hosted by the DU 1531, or with the control functions hosted by the CU 1511.

Lower-layer functionality can be implemented by one or more RUs 1541. In some deployments, an RU 1541, controlled by a DU 1531, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1541 can be implemented to handle over the air (OTA) communication with one or more UEs 1521. In some implementations, real-time and non-real-time aspects of control and user plane communication with the RU(s) 1541 can be controlled by the corresponding DU 1531. In some scenarios, this configuration can enable the DU(s) 1531 and the CU 1511 to be implemented in a cloud-based RAN architecture, such as a vRAN architecture.

The SMO Framework 1507 may be configured to support RAN deployment and provisioning of non-virtualized and virtualized network elements. For non-virtualized network elements, the SMO Framework 1507 may be configured to support the deployment of dedicated physical resources for RAN coverage requirements which may be managed via an operations and maintenance interface (such as an O1 interface). For virtualized network elements, the SMO Framework 1507 may be configured to interact with a cloud computing platform (such as an open cloud (O-Cloud) 1591) to perform network element life cycle management (such as to instantiate virtualized network elements) via a cloud computing platform interface (such as an O2 interface). Such virtualized network elements can include, but are not limited to, CUs 1511, DUs 1531, RUs 1541 and Near-RT RICs 1527. In some implementations, the SMO Framework 1507 can communicate with a hardware aspect of a 4G RAN, such as an open eNB (O-eNB) 1513, via an O1 interface. Additionally, in some implementations, the SMO Framework 1507 can communicate directly with one or more RUs 1541 via an O1 interface. The SMO Framework 1507 also may include a Non-RT RIC 1517 configured to support functionality of the SMO Framework 1507.

The Non-RT RIC 1517 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1527. The Non-RT RIC 1517 may be coupled to or communicate with (such as via an A1 interface) the Near-RT RIC 1527. The Near-RT RIC 1527 may be configured to include a logical function that enables near-real-time control and optimization of RAN elements and resources via data collection and actions over an interface (such as via an E2 interface) connecting one or more CUs 1511, one or more DUs 1531, or both, as well as an O-eNB 1513, with the Near-RT RIC 1527.

In some implementations, to generate AI/ML models to be deployed in the Near-RT RIC 1527, the Non-RT RIC 1517 may receive parameters or external enrichment information from external servers. Such information may be utilized by the Near-RT RIC 1527 and may be received at the SMO Framework 1507 or the Non-RT RIC 1517 from non-network data sources or from network functions. In some examples, the Non-RT RIC 1517 or the Near-RT RIC 1527 may be configured to tune RAN behavior or performance. For example, the Non-RT RIC 1517 may monitor long-term trends and patterns for performance and employ AI/ML models to perform corrective actions through the SMO Framework 1507 (such as reconfiguration via 01) or via creation of RAN management policies (such as A1 policies).

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects provided herein. However, it will be understood by one of ordinary skill in the art that the aspects may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. In some aspects, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, in some aspects, instructions and data which cause or otherwise configure a general-purpose computer, special purpose computer, or a processing device to perform a certain function or group of functions. Portions of computer resources used can be accessible over a network. The computer executable instructions may be, in some aspects, binaries, intermediate format instructions such as assembly language, firmware, source code. Examples of computer-readable media that may be used to store instructions, information used, and/or information created during methods according to described approaches include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, according to some aspects.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, in some aspects, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. In some aspects, claim language reciting "at least one of A and B" or "at least one of A or B" means A, B, or A and B. In some aspects, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. In some aspects, claim language reciting "at least one of A and B" or "at least one of A or B" can mean A, B, or A and B, and can additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the aspects disclosed herein may be implemented as electronic hardware, computer software, firmware, or combinations thereof. To clearly illustrate the interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules, engines, or components may be implemented together in an integrated logic device or separately as discrete but interoperable logic devices. If implemented in software, then the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for wireless communication at a user equipment (UE), the apparatus comprising: at least one memory; and at least one processor coupled to at least one memory and configured to: obtain channel estimation of at least one channel for communication with a network device; obtain a location parameter associated with the apparatus; determine, based at least on the channel estimation, one or more large scale parameters (LSPs); generate an LSP vector associated with the one or more LSPs; and transmit, to the network device, the LSP vector and the location parameter of the apparatus.

Aspect 2. The apparatus of Aspect 1, wherein at least one LSP of the one or more LSPs comprises at least one of a path loss (PL) of the channel estimation, a delay spread (DS) of the channel estimation, an angular spread of the channel estimation, a Ricean K factor (K) and a shadow fading (SF).

Aspect 3. The apparatus of Aspect 2, wherein the angular spread comprises at least one of an azimuth angular spread of arrival (ASA), an azimuth angular spread of departure (ASD), a zenith angular spread of arrival (ZSA), or a zenith angle spread of departure (ZSD).

Aspect 4. The apparatus of any one of Aspects 1 to 3, wherein the at least one processor is configured to: determine, based at least on the channel estimation, the one or more LSPs using a promptable decoder that receives a measurement positional embedding and a map as part of a query to the promptable decoder.

Aspect 5. The apparatus of any one of Aspects 1 to 4, wherein the at least one processor is configured to: determine, based at least on the channel estimation, the one or more LSPs based on a conditional LSP map inpainting using a building and height map.

Aspect 6. The apparatus of any one of Aspects 1 to 5, wherein the at least one processor is configured to: determine, based at least on the channel estimation, the one or more LSPs by computing a mean squared error loss only on unmeasured predicted LSPs that are not part of an input set.

Aspect 7. The apparatus of any one of Aspects 4 to 6, wherein the promptable decoder is configured to accept a different query input during each inference.

Aspect 8. The apparatus of any one of Aspects 4 to 7, wherein the promptable decoder is configured to receive an inter-patch positioning embedding and utilize the map in the query to indicate an index of a map patch correspondence to a given query embedding.

Aspect 9. The apparatus of any one of Aspects 4 to 8, wherein the promptable decoder is configured to utilize a building and height map to perform conditional LSP map inpainting.

Aspect 10. The apparatus of Aspect 9, wherein the promptable decoder is configured to receive embedded measured LSPs from an encoder and receive the building and height map as a map embedding to predict unmeasured LSPs.

Aspect 11. The apparatus of any one of Aspects 4 to 10, wherein the promptable decoder is trained utilizing a varying number of LSP measurements.

Aspect 12. The apparatus of Aspect 11, wherein a mean-square error loss is only computed on unmeasured predicted LSPs.

Aspect 13. The apparatus of any one of Aspects 11 or 12, wherein the promptable decoder is trained utilizing a randomized number of LSP measurements.

Aspect 14. An apparatus for wireless communication at a network device, the apparatus comprising: at least one memory; and at least one processor coupled to at least one memory and configured to: receive, from a user equipment (UE), a large scale parameter (LSP) vector and a location of the UE, the LSP vector comprising at least one parameter based on an estimated channel at the location of the UE; obtain map information associated with UE, the map information comprising a previously trained LSP map; predict, based at least on the map information and the LSP vector, at least one LSP for at least one unmeasured location, wherein the at least one unmeasured location comprises a different location from the location of the UE; and transmit the at least one LSP to at least one UE.

Aspect 15. The apparatus of Aspect 14, wherein the at least one processor is configured to: receive a plurality of LSP vectors and a plurality of locations of a plurality of UEs, wherein each respective LSP vector is associated with a respective location of the plurality of locations; and predict the at least one LSP for the at least one unmeasured location based on the plurality of LSP vectors and the respective location of the plurality of locations.

Aspect 16. The apparatus of any one of Aspects 14 or 15, wherein at least one LSP of the LSP vector comprises at least one of a path loss (PL) of the channel estimation, a delay spread (DS) of the channel estimation, an angular spread of the channel estimation, a Ricean K factor (K) and a shadow fading (SF).

Aspect 17. The apparatus of Aspect 16, wherein the angular spread comprises at least one of an azimuth angular spread of arrival (ASA), an azimuth angular spread of departure (ASD), a zenith angular spread of arrival (ZSA), or a zenith angle spread of departure (ZSD).

Aspect 18. The apparatus of any one of Aspects 14 to 17, wherein the at least one processor is configured to predict the at least one LSP using a prediction model trained using one or more maps as queries and LSP vectors from measured UE locations.

Aspect 19. The apparatus of Aspect 18, wherein the at least one processor is configured to finetune the prediction model based on a plurality of LSP vectors and a plurality of locations of a plurality of UEs to generate a finetuned prediction model.

Aspect 20. The apparatus of Aspect 19, wherein the trained prediction model and the finetuned prediction model include at least one transformer neural network.

Aspect 21. The apparatus of any one of Aspects 19 or 20, wherein the at least one processor is configured to: receive, from at least one additional UE, a respective location of the at least one additional UE; and output, for transmission to at least one additional UE, a respective predicted large scale parameter (LSP) vector for the respective location of the at least one additional UE.

Aspect 22. An apparatus for wireless communication, the apparatus comprising: at least one memory; and at least one processor coupled to at least one memory and configured to: transmit, to a network device, a location of the apparatus; receive, from the network device, a predicted large scale parameter (LSP) vector based on the location of the apparatus; and generate channel samples using at least the predicted LSP vector.

Aspect 23. The apparatus of Aspect 22, wherein the at least one processor coupled to at least one memory is configured to perform, based on the channel samples generated by a generative channel model (GCM), reference signal optimization.

Aspect 24. The apparatus of any one of Aspects 22 or 23, wherein the apparatus is a user equipment (UE).

Aspect 25. The apparatus of any one of Aspects 22 to 24, wherein at least one LSP of the predicted LSP vector comprises at least one of a path loss (PL) of a channel estimation, a delay spread (DS) of the channel estimation, an angular spread of the channel estimation, a Ricean K factor (K) and a shadow fading (SF).

Aspect 26. The apparatus of Aspect 25, wherein the angular spread comprises at least one of an azimuth angular spread of arrival (ASA), an azimuth angular spread of departure (ASD), a zenith angular spread of arrival (ZSA), or a zenith angel spread of departure (ZSD).

Aspect 27. The apparatus of any one of Aspects 22 to 26, wherein the at least one processor is configured to process the predicted LSP vector using a generative channel model (GCM) to generate the channel samples.

Aspect 28. An apparatus for generating one or more synthetic large scale parameter (LSP) maps, the apparatus comprising: at least one memory; and at least one processor coupled to at least one memory and configured to: obtain a map having a network device location identified on the map; obtain at least one synthetic measurement associated with the network device location; and determine, based at least on the map and the at least one synthetic measurement, a LSP map.

Aspect 29. The apparatus of Aspect 28, wherein the at least one synthetic measurement comprises a plurality of synthetic measurements.

Aspect 30. The apparatus of any one of Aspects 28 or 29, wherein the at least one synthetic measurement comprises at least one LSP, wherein the at least one LSP comprises at least one of a path loss (PL) of a channel estimation, a delay spread (DS) of the channel estimation, an angular spread of the channel estimation, a Ricean K factor (K) and a shadow fading (SF).

Aspect 31. The apparatus of any one of Aspects 28 to 30, wherein the LSP map comprises a synthetic (LSP) map.

Aspect 32. The apparatus of Aspect 31, wherein the at least one synthetic measurement comprises a plurality of synthetic measurements.

Aspect 33. The apparatus of any one of Aspects 31 or 32, wherein the at least one synthetic measurement comprises at least one large scale parameter (LSP), wherein the at least one LSP comprises at least one of a path loss (PL) of a channel estimation, a delay spread (DS) of the channel estimation, an angular spread of the channel estimation, a Ricean K factor (K) and a shadow fading (SF).

Aspect 34. The apparatus of any one of Aspects 31 to 33, wherein the at least one processor coupled to at least one memory is configured to: determine, based at least on the map and the at least one synthetic measurement, the synthetic LSP map using a machine learning model.

Aspect 35. An apparatus for generating a synthetic large scale parameter map, the apparatus comprising: at least one memory; and at least one processor coupled to at least one memory and configured to: obtain a map having a network device location identified on the map; obtain at least one measurement associated with the network device location; and train, based at least on the map and the at least one measurement, a machine learning model to generate a synthetic large scale parameter (LSP) map.

Aspect 36. The apparatus of Aspect 35, wherein the at least one measurement comprises a plurality of measurements.

Aspect 37. The apparatus of any one of Aspects 35 or 36, wherein the at least one measurement comprises one of at least one synthetic measurement or at least one real measurement.

Aspect 38. The apparatus of any one of Aspects 35 to 37, wherein, when the at least one measurement comprises at least one large scale parameter (LSP), wherein the at least one LSP comprises at least one of a path loss (PL) of a channel estimation, a delay spread (DS) of the channel estimation, an angular spread of the channel estimation, a Ricean K factor (K) and a shadow fading (SF).

Aspect 39. The apparatus of any one of Aspects 35 to 38, wherein the at least one processor coupled to at least one memory is configured to: generate, based at least on the map and the at least one measurement, the synthetic LSP map using a machine learning model.

Aspect 40. An apparatus for training a machine learning model, the apparatus comprising: at least one memory; and at least one processor coupled to at least one memory and configured to: obtain sparse synthetic measurements and a geographic map having a network device at a location; train the machine learning model on the sparse synthetic measurements and the geographic map to generate a complete large scale parameter map to generate a trained machine learning model; obtain sparse real measurements and the complete large scale parameter map; and finetune the trained machine learning model based on the sparse real measurements and the complete large scale parameter map to generate a finetuned machine learning model.

Aspect 41. The apparatus of Aspect 40, wherein the machine learning model comprises a transformer neural network having an encoder and a decoder in which the decoder receives one or more geographic map as an input to the decoder.

Aspect 42. The apparatus of Aspect 41, wherein the one or more geographic maps comprises one or more of a three-dimensional map, a building map and a height map about a mapped region.

Aspect 43. An apparatus for training a transformer, the apparatus comprising: at least one memory; and at least one processor coupled to at least one memory and configured to: obtain sparse large scale parameter (LSP) measurements at an encoder of the transformer; obtain, at the encoder, a positional embedding identifying locations of the sparse LSP measurements; generate, by the encoder, a dataset; receive the dataset at a decoder of the transformer; receive a map tuple as a prompt to the decoder; and output, using the map tuple as a guide and from the decoder, a complete LSP map for a geographic area.

Aspect 44. The apparatus of Aspect 43, wherein the map tuple comprises a building and height map tuple.

Aspect 45. A method for wireless communication, comprising: obtaining channel estimation of at least one channel for communication with a network device; obtaining a location parameter associated with the apparatus; determining, based at least on the channel estimation, one or more large scale parameters (LSPs); generating an LSP vector associated with the one or more LSPs; and transmitting, to the network device, the LSP vector and the location parameter of the apparatus.

Aspect 46. The method of Aspect 45, further comprising operations according to any of Aspects 1 to 13.

Aspect 47. A method for wireless communication, the method comprising: receiving, from a user equipment (UE), a large scale parameter (LSP) vector and a location of the UE, the LSP vector comprising at least one parameter based on an estimated channel at the location of the UE; obtaining map information associated with UE, the map information comprising a previously trained LSP map; predicting, based at least on the map information and the LSP vector, at least one LSP for at least one unmeasured location, wherein the at least one unmeasured location comprises a different location from the location of the UE; and transmitting the at least one LSP to at least one UE.

Aspect 48. The method of Aspect 45, further comprising operations according to any of Aspects 15 to 21.

Aspect 49. A method for wireless communication, comprising operations according to any of Aspects 1 to 44.

Aspect 50. A non-transitory computer-readable medium having stored thereon instructions that, when executed by one or more processors, cause the one or more processors to perform operations according to any of Aspects 1 to 44.

Aspect 51. An apparatus for wireless communication, the apparatus including one or more means for performing operations according to any of Aspects 1 to 44.

What is claimed is:

1. An apparatus for wireless communication at a user equipment (UE), the apparatus comprising:
at least one memory; and
at least one processor coupled to at least one memory and configured to:
obtain channel estimation of at least one channel for communication with a network device;
obtain a location parameter associated with the apparatus;
determine, based at least on the channel estimation, one or more large scale parameters (LSPs);
generate an LSP vector associated with the one or more LSPs; and
transmit, to the network device, the LSP vector and the location parameter of the apparatus.

2. The apparatus of claim 1, wherein at least one LSP of the one or more LSPs comprises at least one of a path loss (PL) of the channel estimation, a delay spread (DS) of the channel estimation, an angular spread of the channel estimation, a Ricean K factor (K) and a shadow fading (SF).

3. The apparatus of claim 2, wherein the angular spread comprises at least one of an azimuth angular spread of arrival (ASA), an azimuth angular spread of departure (ASD), a zenith angular spread of arrival (ZSA), or a zenith angle spread of departure (ZSD).

4. The apparatus of claim 1, wherein the at least one processor is configured to: determine, based at least on the channel estimation, the one or more LSPs using a promptable decoder that receives a measurement positional embedding and a map as part of a query to the promptable decoder.

5. The apparatus of claim 1, wherein the at least one processor is configured to: determine, based at least on the channel estimation, the one or more LSPs based on a conditional LSP map inpainting using a building and height map.

6. The apparatus of claim 1, wherein the at least one processor is configured to: determine, based at least on the channel estimation, the one or more LSPs by computing a mean squared error loss only on unmeasured predicted LSPs that are not part of an input set.

7. The apparatus of claim 4, wherein the promptable decoder is configured to accept a different query input during each inference.

8. The apparatus of claim 4, wherein the promptable decoder is configured to receive an inter-patch positioning embedding and utilize the map in the query to indicate an index of a map patch correspondence to a given query embedding.

9. The apparatus of claim 4, wherein the promptable decoder is configured to utilize a building and height map to perform conditional LSP map inpainting.

10. The apparatus of claim 9, wherein the promptable decoder is configured to receive embedded measured LSPs from an encoder and receive the building and height map as a map embedding to predict unmeasured LSPs.

11. The apparatus of claim 4, wherein the promptable decoder is trained utilizing a varying number of LSP measurements.

12. The apparatus of claim 11, wherein a mean-square error loss is only computed on unmeasured predicted LSPs.

13. The apparatus of claim 11, wherein the promptable decoder is trained utilizing a randomized number of LSP measurements.

14. An apparatus for wireless communication at a network device, the apparatus comprising:
at least one memory; and
at least one processor coupled to at least one memory and configured to:
receive, from a user equipment (UE), a large scale parameter (LSP) vector and a location of the UE, the LSP vector comprising at least one parameter based on an estimated channel at the location of the UE;
obtain map information associated with UE, the map information comprising a previously trained LSP map;
predict, based at least on the map information and the LSP vector, at least one LSP for at least one unmeasured location, wherein the at least one unmeasured location comprises a different location from the location of the UE; and
transmit the at least one LSP to at least one UE.

15. The apparatus of claim 14, wherein the at least one processor is configured to:
receive a plurality of LSP vectors and a plurality of locations of a plurality of UEs, wherein each respective LSP vector is associated with a respective location of the plurality of locations; and predict the at least one LSP for the at least one unmeasured location based on the plurality of LSP vectors and the respective location of the plurality of locations.

16. The apparatus of claim 14, wherein at least one LSP of the LSP vector comprises at least one of a path loss (PL) of the channel estimation, a delay spread (DS) of the channel estimation, an angular spread of the channel estimation, a Ricean K factor (K) and a shadow fading (SF).

17. The apparatus of claim 16, wherein the angular spread comprises at least one of an azimuth angular spread of arrival (ASA), an azimuth angular spread of departure (ASD), a zenith angular spread of arrival (ZSA), or a zenith angle spread of departure (ZSD).

18. The apparatus of claim 14, wherein the at least one processor is configured to predict the at least one LSP using a prediction model trained using one or more maps as queries and LSP vectors from measured UE locations.

19. The apparatus of claim 18, wherein the at least one processor is configured to finetune the prediction model based on a plurality of LSP vectors and a plurality of locations of a plurality of UEs to generate a finetuned prediction model.

20. The apparatus of claim 19, wherein the trained prediction model and the finetuned prediction model include at least one transformer neural network.

21. The apparatus of claim 19, wherein the at least one processor is configured to:
receive, from at least one additional UE, a respective location of the at least one additional UE; and
output, for transmission to at least one additional UE, a respective predicted large scale parameter (LSP) vector for the respective location of the at least one additional UE.

22. An apparatus for wireless communication, the apparatus comprising:
at least one memory; and
at least one processor coupled to at least one memory and configured to:
transmit, to a network device, a location of the apparatus;
receive, from the network device, a predicted large scale parameter (LSP) vector based on the location of the apparatus; and
generate channel samples using at least the predicted LSP vector.

23. The apparatus of claim 22, wherein the at least one processor coupled to at least one memory is configured to perform, based on the channel samples generated by a generative channel model (GCM), reference signal optimization.

24. The apparatus of claim 22, wherein the apparatus is a user equipment (UE).

25. The apparatus of claim 22, wherein at least one LSP of the predicted LSP vector comprises at least one of a path loss (PL) of a channel estimation, a delay spread (DS) of the channel estimation, an angular spread of the channel estimation, a Ricean K factor (K) and a shadow fading (SF).

26. The apparatus of claim 25, wherein the angular spread comprises at least one of an azimuth angular spread of arrival (ASA), an azimuth angular spread of departure (ASD), a zenith angular spread of arrival (ZSA), or a zenith angel spread of departure (ZSD).

27. The apparatus of claim 22, wherein the at least one processor is configured to process the predicted LSP vector using a generative channel model (GCM) to generate the channel samples.

28. An apparatus for generating one or more synthetic large scale parameter (LSP) maps, the apparatus comprising:
at least one memory; and
at least one processor coupled to at least one memory and configured to:
obtain a map having a network device location identified on the map;
obtain at least one synthetic measurement associated with the network device location; and
determine, based at least on the map and the at least one synthetic measurement, a LSP map.

29. The apparatus of claim 28, wherein the at least one synthetic measurement comprises a plurality of synthetic measurements.

30. The apparatus of claim 28, wherein the at least one synthetic measurement comprises at least one LSP, wherein the at least one LSP comprises at least one of a path loss (PL) of a channel estimation, a delay spread (DS) of the channel estimation, an angular spread of the channel estimation, a Ricean K factor (K) and a shadow fading (SF).

* * * * *